United States Patent
Kunito et al.

(10) Patent No.: US 10,430,572 B2
(45) Date of Patent: Oct. 1, 2019

(54) INFORMATION PROCESSING SYSTEM THAT RECOGNIZES A USER, STORAGE MEDIUM, AND INFORMATION PROCESSING METHOD

(71) Applicant: SONY CORPORATION, Tokyo (JP)

(72) Inventors: Yoshiyuki Kunito, Kanagawa (JP); Taizo Shirai, Kanagawa (JP); Kazuyuki Sakoda, Chiba (JP)

(73) Assignee: SONY CORPORATION, Tokyo (JP)

( * ) Notice: Subject to any disclaimer, the term of this patent is extended or adjusted under 35 U.S.C. 154(b) by 215 days.

(21) Appl. No.: 15/310,038

(22) PCT Filed: Mar. 12, 2015

(86) PCT No.: PCT/JP2015/057320
§ 371 (c)(1),
(2) Date: Nov. 9, 2016

(87) PCT Pub. No.: WO2015/178070
PCT Pub. Date: Nov. 26, 2015

(65) Prior Publication Data
US 2017/0140140 A1 May 18, 2017

(30) Foreign Application Priority Data
May 19, 2014 (JP) ................................. 2014-103526

(51) Int. Cl.
*G06F 21/32* (2013.01)
*G06Q 30/02* (2012.01)
*G06F 21/62* (2013.01)
(52) U.S. Cl.
CPC .......... *G06F 21/32* (2013.01); *G06F 21/6245* (2013.01); *G06Q 30/02* (2013.01)

(58) Field of Classification Search
CPC ...... G06F 21/32; G06F 21/6245; G06Q 30/02
See application file for complete search history.

(56) References Cited

U.S. PATENT DOCUMENTS 7,515,136 B1 * 4/2009 Kanevsky .......... G06Q 30/0267
345/156
8,497,773 B2 * 7/2013 Arnold ................... G06Q 30/02
340/5.9
(Continued)

FOREIGN PATENT DOCUMENTS

JP 2010-205059 A 9/2010
JP 2011-22861 A 2/2011
(Continued)

OTHER PUBLICATIONS

Michael Fitzpatrick, "Advertising Billboards Use Facial Recognition to Target Shoppers", The Guardian, Retrieved From https://www.theguardian.com/media/pda/2010/sep/27/advertising-billboards-facial-recognition-japan, Published Sep. 27, 2010 (Year: 2010).*
(Continued)

*Primary Examiner* — Chau Le
(74) *Attorney, Agent, or Firm* — Xsensus LLP

(57) ABSTRACT

[Object] To provide an information processing system, a storage medium, and an information processing method which can provide customized services according to a user's context.
[Solution] Provided is an information processing system including a recognition unit configured to recognize a user, a provision unit configured to provide specific information specific to the user recognized by the recognition unit, and a control unit configured to control the provision unit so that the provision unit provides provision information to the user according to approval from the user.

19 Claims, 13 Drawing Sheets

(56) References Cited

U.S. PATENT DOCUMENTS

| | | | | |
|---|---|---|---|---|
| 8,615,565 | B2* | 12/2013 | Randall | G06Q 30/02 709/206 |
| 8,897,707 | B2* | 11/2014 | Faith | G06Q 30/0201 345/156 |
| 8,910,309 | B2* | 12/2014 | Harrison | H04L 63/107 726/30 |
| 9,293,042 | B1* | 3/2016 | Wasserman | G06Q 30/0265 |
| 2005/0021393 | A1* | 1/2005 | Bao | G06Q 30/02 705/14.64 |
| 2007/0277413 | A1* | 12/2007 | Bailey | G09F 27/00 40/606.03 |
| 2009/0084612 | A1* | 4/2009 | Mattice | G06F 3/0436 178/18.04 |
| 2009/0094561 | A1* | 4/2009 | Do | G06F 3/0425 715/863 |
| 2009/0288012 | A1* | 11/2009 | Hertel | G06Q 20/02 715/738 |
| 2010/0225471 | A1 | 9/2010 | Kawamoto et al. | |
| 2011/0283236 | A1* | 11/2011 | Beaumier | G07F 11/002 715/835 |
| 2011/0307578 | A1* | 12/2011 | Cheon | G06F 1/3231 709/217 |
| 2014/0059447 | A1* | 2/2014 | Berk | G06Q 10/10 715/751 |
| 2014/0079212 | A1* | 3/2014 | Sako | H04M 1/60 379/395 |
| 2014/0125451 | A1* | 5/2014 | Sako | H05B 37/029 340/4.2 |
| 2016/0110759 | A1* | 4/2016 | Polehn | G06Q 30/0251 705/14.49 |

FOREIGN PATENT DOCUMENTS

| | | |
|---|---|---|
| JP | 2012-113655 A | 6/2012 |
| JP | 2013-41429 A | 2/2013 |
| JP | 2013-125047 A | 6/2013 |
| JP | 2013-238959 A | 11/2013 |
| WO | 2013/147003 A1 | 10/2013 |

OTHER PUBLICATIONS

"Digital Signage System", Mobile Renkei Kento Report, available online at http://www.digital-signage.jp/files/information/share/30343231.pdf, pp. 13 to 21.

Koichi Kuzume, "An Individual Characteristic Adaptive User Interface Using Tooth-touch Sound and Application to ECS", IEICE Technical Report, vol. 106, No. 612, Mar. 16, 2007, pp. 121-126.

International Search Report and Written Opinion of PCT Application No. PCT/JP2015/057320, dated May 12, 2015, 09 pages of English Translation and 09 pages of ISRWO.

International Preliminary Report on Patentability of PCT Application No. PCT/JP2015/057320, dated Nov. 22 2016, 6 pages.

* cited by examiner

INFORMATION PROCESSING SYSTEM THAT RECOGNIZES A USER, STORAGE MEDIUM, AND INFORMATION PROCESSING METHOD

CROSS REFERENCE TO RELATED APPLICATIONS

This application is a U.S. National Phase of International Patent Application No. PCT/JP2015/057320 filed on Mar. 12, 2015, which claims priority benefit of Japanese Patent Application No. JP 2014-103526 filed in the Japan Patent Office on May 19, 2014. Each of the above-referenced applications is hereby incorporated herein by reference in its entirety.

TECHNICAL FIELD

The present disclosure relates to information processing systems, storage media, and information processing methods.

BACKGROUND ART

Signage terminals are recently becoming widespread in many places such as shopping malls, airports, stations, public offices, and the like. Signage terminals display a variety of kinds of information such as advertisements, weather information, guide maps, and the like, to provide a range of convenience to passerby. In order to provide a wider range of convenience to users using such signage terminals, techniques of providing services to individual users have been developed.

For example, Patent Literature 1 below discloses a technique of recognizing a user by facial recognition, and displaying contents corresponding to the recognized user's preference on a signage terminal.

Also, Patent Literature 2 discloses a technique of displaying contents for an individual user on a signage terminal according to the user's attribute information such as sex, age, and the like.

Also, Patent Literature 3 discloses a technique of authenticating a user, and displaying previously registered information which is to be provided to the user, on a signage terminal.

CITATION LIST

Patent Literature

Patent Literature 1: JP 2013-257697A
Patent Literature 2: JP 2011-53767A
Patent Literature 3: JP 2013-238959A

SUMMARY OF INVENTION

Technical Problem

However, in the techniques disclosed in the above patent literature, a signage terminal is used to provide information based on a user's attributes or previously registered information. Therefore, certain information registered in a system is provided to a user in a one-sided manner no matter whether or not the user really desires that information. With this in mind, the present disclosure proposes a novel and improved information processing system, storage medium, and information processing method which can provide customized services according to a user's context.

Solution to Problem

According to the present disclosure, there is provided an information processing system including a recognition unit configured to recognize a user, a provision unit configured to provide specific information specific to the user recognized by the recognition unit, and a control unit configured to control the provision unit so that the provision unit provides provision information to the user according to approval from the user.

According to the present disclosure, there is provided a storage medium storing a program for causing a computer to function as a recognition unit configured to recognize a user, a provision unit configured to provide specific information specific to the user recognized by the recognition unit, and a control unit configured to control the provision unit so that the provision unit provides provision information to the user according to approval from the user.

According to the present disclosure, there is provided an information processing method executed by a processor, the method including recognizing a user, providing specific information specific to the recognized user, and performing control such that provision information is provided to the user according to approval from the user.

Advantageous Effects of Invention

As described above, according to the present disclosure, customized services can be provided according to a user's context.

Note that the effects described above are not necessarily limitative. With or in the place of the above effects, there may be achieved any one of the effects described in this specification or other effects that may be grasped from this specification.

DESCRIPTION OF EMBODIMENT(S)

Figure 1:
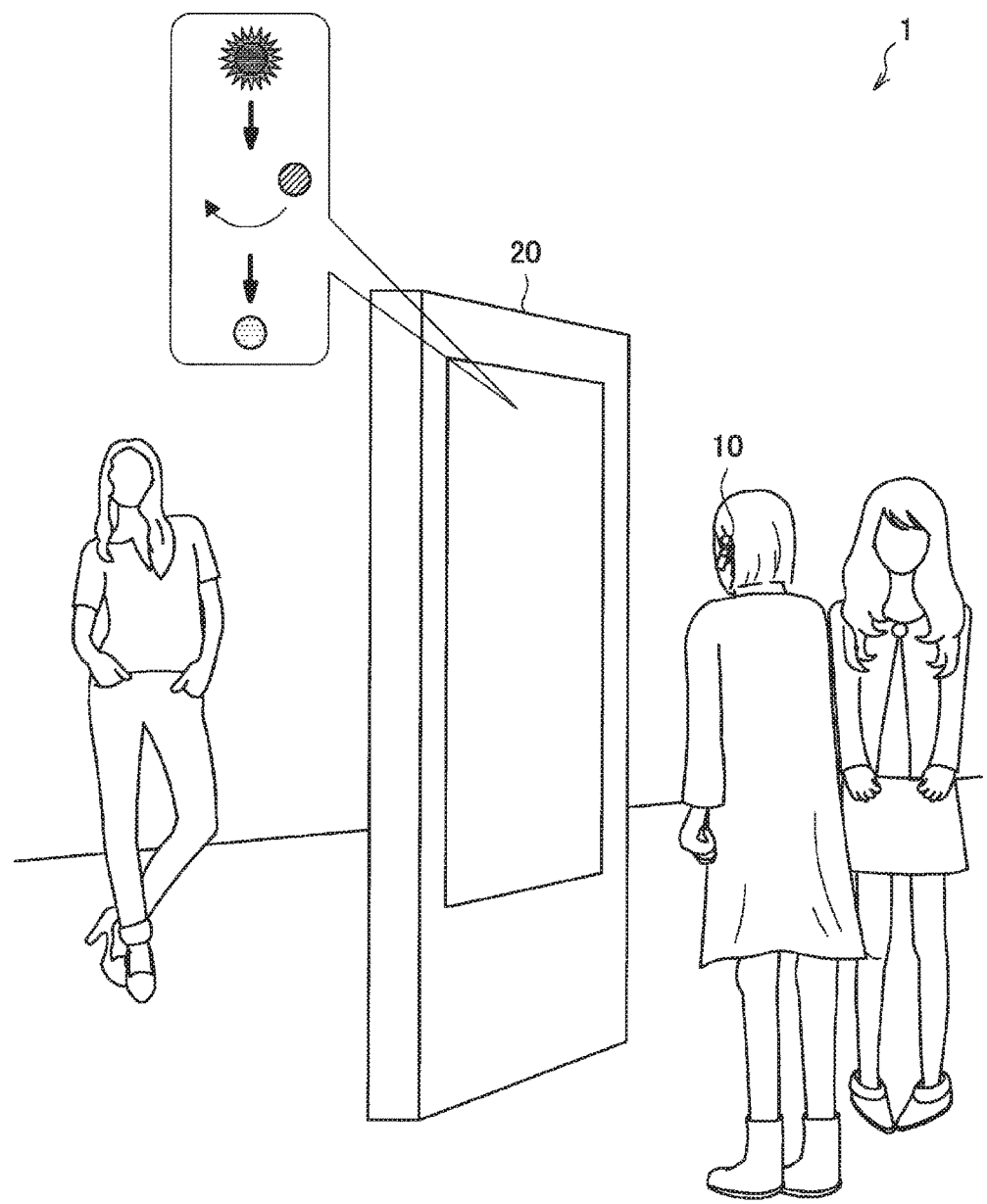
FIG. 1 is a diagram for describing an overview of an information providing system according to one embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Overview
2. Configuration examples
2-1. General configuration examples
2-2. Configuration examples of user device
2-3. Configuration examples of output apparatus
2-4. Configuration examples of server
3. Operation process
3-1. Operation example 1
3-2. Operation example 2
3-3. Operation example 3
3-4. Operation example 4
3-5. Operation example 5
4. Conclusion 1. Overview As various information processing terminals have been developed and widespread, the ambient society is recently becoming a reality. The ambient society means a society in which information processing terminals are ubiquitous around humans (users), and users can unintentionally use the terminals. In particular, in the ambient society, while users are not required to intentionally perform operations, systems can sense users' context, and provide services which are desired by users. Context means information such as information about a user's background (e.g., the history of a user's actions, a user's interests and preferences, etc.), information about a user's situation (e.g., a current surrounding environment, events occurring in a surrounding area, a user's schedule, etc.), and the like.

An example of services which can be provided in the ambient society will now be described. As an example, a service example will be described which is provided to a user who is a foreign tourist visiting Japan.

For example, the user is wearing a wearable user device which exchanges information with a system. The user device may be capable of receiving and outputting audio or displaying a screen, and the like. The system is an information processing system which includes user devices, information processing terminals ubiquitous around users, and back-end apparatuses therefor.

The user previously registers, into the system, information indicating, for example, schedules, foods which the user desires to eat, and taboos. As a result, the user can receive a navigation service corresponding to a schedule, or information about restaurants located along a route indicated by a schedule. These kinds of information may be provided in, for example, the language of the user's mother country. The system may check empty tables using a camera installed in a restaurant before information about the restaurant is provided. The system may also tell a facility which is a user's destination to put a staff member who can speak the language of the user's mother country on ready prior to the user's action.

The user may previously register information about, for example, their illness, normal body temperature, and the like. The system acquires biological information about the user, such as their body temperature, heart rate, and the like, to detect the user's poor physical conditions, and suggest a Japanese over-the-counter drug, suggest a nearby hospital, or propose that a schedule should be changed. The system may also, for example, detect poor physical conditions of a child traveling together with the user, through the child's user device, and then notify the user of the result of the detection. Note that when the user removes their user device, the user device may detect the removal on the basis of information about a change in biological information, an acceleration, or the like, and switch to the power-saving mode.

The user may also previously register, for example, information about the language of the user's mother country and other languages which the user can speak, into the system. When the user cannot speak Japanese, the system provides a Japanese-language translation service to the user. For example, when a hotel worker is also wearing a user device, the user's voice which has been translated may be played back in the worker's ear, and the worker's voice which has been translated may be played back in the user's ear.

These kinds of information are provided in the form of voices or images, and therefore, when other people are present around the user, the information may leak out to them. Also, in some instances, it is not be necessary at all to provide such information. Therefore, the system may ask the user whether or not they need information, prior to providing the information. For example, the user may register, into the system, an authentication method for approving or refusing the acceptance of a service provided from the system. For example, like so-called challenge-response authentication, a combination of an output of the system and the user's input may be registered as an authentication procedure so that a user who has entered the specific input with respect to the specific output of the system is authenticated, while a user who has failed to enter the specific input with respect to the specific output of the system is not authenticated. Note that the output of the system is also hereinafter referred to as an authentication code, and the user's input is also referred to as a passcode. With such an authentication process employing an authentication code and a passcode, for example, when user customized information is provided on a signage terminal on a street, a display built in a train seat, or the like, the privacy of the user can be protected, and unnecessary information can be prevented from being provided. Also, the process of logging in to a user device may be performed through the authentication process, for example. Note that the authentication process may be removed in environments where privacy is protected, such as, for example, the user's own home, hotel room, or the like.

In addition, the system may provide various customized services based on the context of the user. For example, the system tracks an object being viewed which is present on the user's line of sight, on the basis of a captured image of the user captured by a surrounding camera, to capture and record an image of the object being viewed, and provide the image of the object. As a result, for example, when the user is watching a sport, a recorded video of a player who has been tracked by the user's eyes may be provided.

Also, the user may move while carrying baggage. The system captures and recognizes images of the user and their baggage using, for example, a surrounding camera, and associates the user with their baggage. As a result, for example, the system issues a warning when the user may have left their baggage behind, or recommends using a locker before the user goes sightseeing.

In the foregoing, an example of services which may be provided in the ambient society has been described. In the present disclosure, techniques involved in the above authentication process will be described in detail. Firstly, an overview of an information providing system (information processing system) according to one embodiment of the present disclosure will be described with reference to FIG. 1.

FIG. 1 is a diagram for describing an overview of an information providing system 1 according to one embodiment. As shown in FIG. 1, the information providing system 1 includes a user device 10 and an output apparatus 20.

The user device 10 is an apparatus which functions as an input/output interface between the information providing system 1 and the user. In the example of FIG. 1, the user device 10 is a wearable device which is worn on an ear. The user device 10 can play back audio in the user's ear, and can play back audio only to the user without being overheard. Similarly, the user device 10 can detect a subtle action which is performed by the user in a manner which prevents the action from being noticed by other people. For example, the user device 10 can detects a sound which is made by the user causing the upper and lower teeth to knock together. The user device 10 is not limited to the example shown in FIG. 1, and may be, for example, a head mounted display (HMD), headset, digital video camera, personal digital assistant (PDA), personal computer (PC), notebook PC, tablet terminal, smartphone, mobile telephone terminal, mobile music player, mobile video processing apparatus, handheld game machine, or the like.

The output apparatus 20 is an apparatus which provides information from the information providing system 1 to users. In the example shown in FIG. 1, the output apparatus 20 is a signage terminal which provides information to users using images. The output apparatus 20 communicates with the user device 10 which is located close to the screen, to identify the user, and check the presence or absence of provision information which is to be provided to the identified user. Thereafter, the output apparatus 20 outputs an authentication code, and then if it receives a passcode input from the user, decides that it is approved by the user, and outputs provision information which is to be provided to the user. In the example of FIG. 1, the output apparatus 20 displays, as an authentication code, a point which flickers in red, changes to blue and turns clockwise, and finally changes to yellow and fades out. In response to this, for example, the user inputs, into the user device 10, a passcode which is represented by a rhythmic sound made by causing the teeth to knock together. The user themselves can control and decide whether to accept the provision of information by inputting or not inputting a passcode, and therefore, can selectively accept the provision of customized information suitable for context.

Also, when a signage terminal outputs customized information, the signage terminal specifies to which user the information is directed like, for example, "Mr. Taro YAMADA, you have a new mail," before outputting the information. Therefore, if the information which identifies a user is seen by other people, the privacy of the user may be invaded. In this regard, in this embodiment, information for identifying a user is output an authentication code in a form which makes it difficult for people other than the user to identify the information, and therefore, privacy can be protected.

In the foregoing, an overview of the information providing system 1 according to this embodiment has been described. Next, configuration examples of the information providing system 1 according to this embodiment will be described with reference to FIG. 2 to FIG. 5.

2. Configuration Examples

2-1. General Configuration Examples

Figure 2:
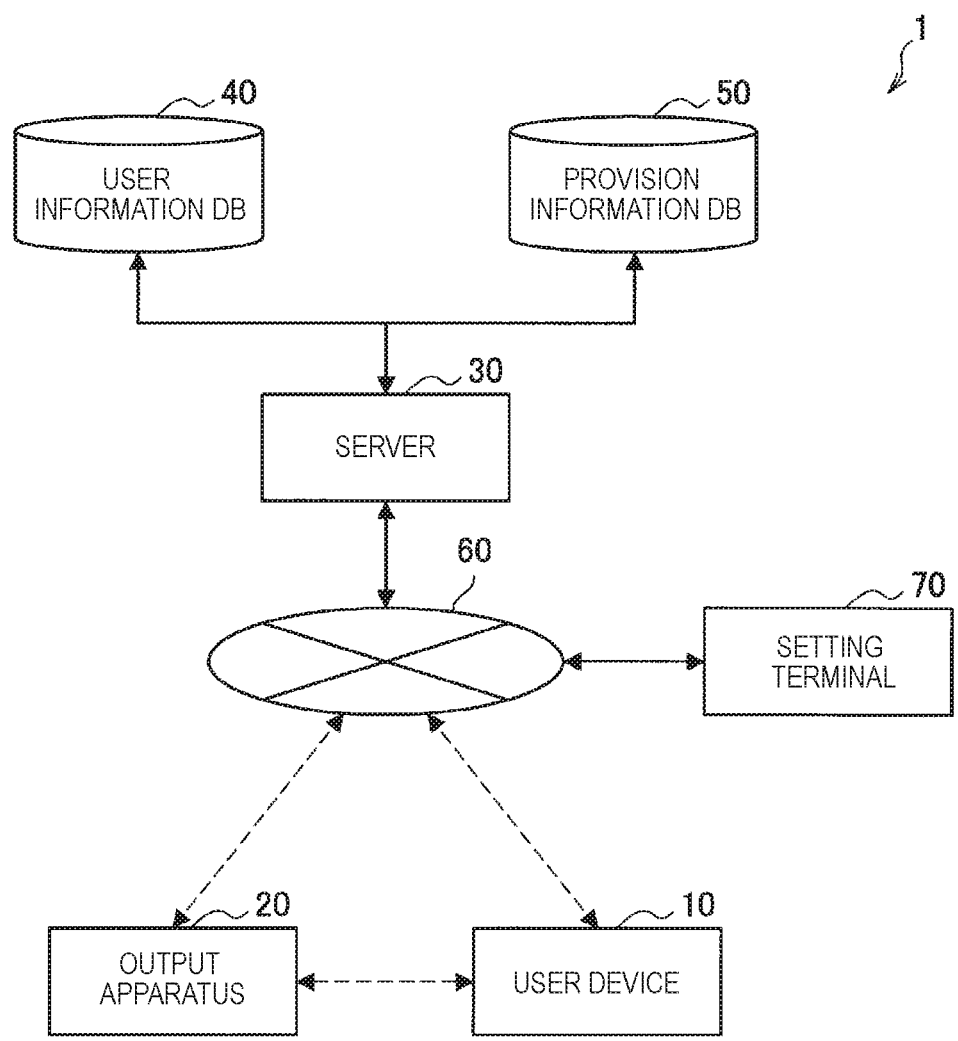
FIG. 2 is a diagram showing a configuration example of the information providing system according to the present embodiment.

FIG. 2 is a diagram showing a configuration example of the information providing system 1 according to this embodiment. As shown in FIG. 2, the information providing system 1 includes, in addition to the user device 10 and the output apparatus 20 described above with reference to FIG. 1, a server 30, a user information DB 40, a provision information DB 50, a network 60, and a setting terminal 70.

(User Device 10)

The user device 10 inputs/outputs and transmits/receives various items of information in order to enable the user to accept the provision of information from the information providing system 1. For example, the user device 10 transmits identification information for identifying the user, to the output apparatus 20. Also, the user device 10 transmits information indicating a passcode input by the user, to the server 30.

(Output Apparatus 20)

The output apparatus 20 is an apparatus which outputs, to users, provision information provided from the information providing system 1. To do this, the output apparatus 20 has the function of transmitting/receiving and inputting/outputting the information. For example, the output apparatus 20 transmits identification information received from the user device 10 to the server 30. Also, the output apparatus 20 receives and outputs an authentication code from the server 30, and then if it is approved by a user, receives and outputs provision information from the server 30.

(Server 30)

The server 30 has the function of controlling the entire information providing system 1. For example, the server 30 acquires an authentication code from the user information DB 40 using a user's identification information received from the output apparatus 20 as a search key, and outputs the authentication code to the output apparatus 20. Thereafter, the server 30 checks whether or not a passcode received from the user device 10 matches one which has been previously registered in the user information DB 40. Also, the server 30 acquires provision information which is to be provided to a user from the provision information DB 50 using the user's identification information as a search key, and outputs the provision information to the output apparatus 20.

(User Information DB 40)

The user information DB 40 has the function of storing user information about users. The user information may include, for example, various items of information such as authentication information which includes a combination of an authentication code and a passcode, attribute information such as age, sex, family relationship, etc., language information indicating the language of a mother country and languages which can be spoken, and the like. The authentication information may be specific to each user. In addition, the user information DB 40 may store information about the installation location or specifications of the output apparatus 20, and may also store information about the output apparatus 20 possessed by a user, for example, by associating the user's identification information with the identification information of the output apparatus 20. Also, the user information may include location information about a place where the privacy of a user can be protected, such as the user's home, a hotel room where the user stays, or the like. The user information DB 40 stores one or more pieces of user information in association with a user's identification information.

(Provision Information DB 50)

The provision information DB 50 has the function of storing provision information which is to be provided to users. The provision information may include, for example, various items of information such as, for example, information for navigation, restaurant information, weather information, hospital information, public transport timetable information, and the like. The provision information DB 50 stores one or more items of information in association with a user's identification information.

(Network 60)

The network 60 is a wired or wireless transmission path for information transmitted from apparatuses connected to the network 60. The network 60 includes, for example, a local area network (LAN), a telephone line, the Internet, an internet protocol-virtual private network (IP-VPN), or the like.

(Setting Terminal 70)

The setting terminal 70 is an apparatus for setting various items of information with respect to the information providing system 1. For example, a user inputs user information through the setting terminal 70. Also, the administrator of the information providing system 1 may input provision information for each user through the setting terminal 70.

2-2. Configuration Examples of User Device

Figure 3:
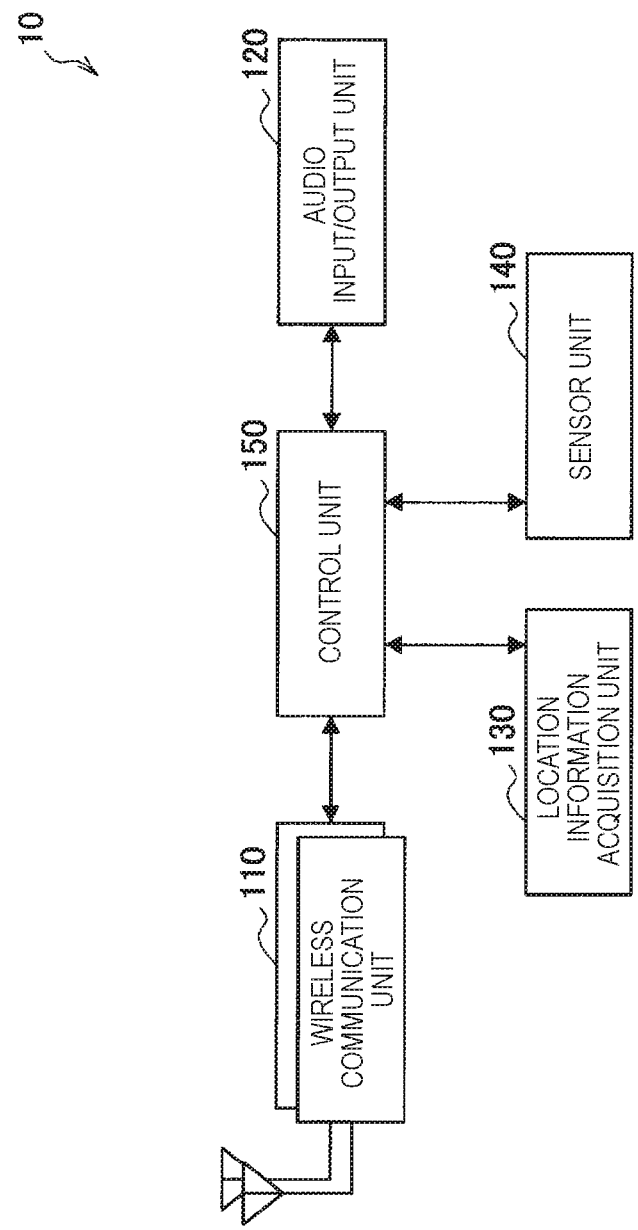
FIG. 3 is a block diagram showing a logical configuration example of a user device according to the present embodiment.

FIG. 3 is a block diagram showing a logical configuration example of the user device 10 according to this embodiment. As shown in FIG. 3, the user device 10 includes a wireless communication unit 110, an audio input/output unit 120, a location information acquisition unit 130, a sensor unit 140, and a control unit 150.

(1) Wireless Communication Unit 110

The wireless communication unit 110 is a communication module which transmits and receives data to and from an external apparatus. The wireless communication unit 110 wirelessly communicates with an external apparatus, directly or through a network access point, in accordance with a scheme such as, for example, a mobile communication network, a wireless LAN, Wireless Fidelity (Wi-Fi) (registered trademark), infrared communication, Bluetooth (registered trademark), near-field communication (NFC), or the like.

For example, the wireless communication unit 110 wirelessly communicates with the output apparatus 20. For this wireless communication, a short-distance wireless communication scheme, such as, for example, infrared communication, Bluetooth, NFC, or the like, is employed. By this wireless communication, for example, the user device 10 finds the output apparatus 20 located therearound, and transmits the identification information of the user who is wearing the user device 10. The wireless communication unit 110 transmits and receives, for example, a signal for finding an apparatus, and transmits the identification information to the output apparatus 20 thus found. The short-distance wireless communication module of the wireless communication unit 110 may intermittently transition to a state in which it can perform communication, thereby saving power. For example, when the transition from the movement state to the still state of the user is detected by an acceleration sensor or the like of the sensor unit 140 described below, the wireless communication unit 110 can, for example, increase the duty ratio of the intermittent operation, thereby efficiently the output apparatus 20 located therearound.

Also, the wireless communication unit 110 communicates with the server 30 through the network 60 in accordance with a communication scheme, such as, for example, a mobile communication network, a wireless LAN, Wi-Fi or the like. By this communication, for example, a passcode input by the user may be transmitted to the server 30, and also, information which is to be output to the user using the audio input/output unit 120 or the like is received from the server 30.

(2) Audio Input/Output Unit 120

The audio input/output unit 120 has the function of collecting sounds and the function of outputting sounds. For example, the function of collecting sounds is implemented in a microphone, which collects a sound of the user wearing the user device 10 or sounds around the user. For example, the audio input/output unit 120 collects a passcode which is represented by a sound made by the user causing the upper and lower teeth to knock together. The audio input/output unit 120 may include a microphone amplifier for amplifying an audio signal obtained by the microphone, an A/D converter, and a signal processing circuit for performing processes such as nose removal, sound source separation, and the like, on audio data. The microphone may be, for example, a bone-conduction microphone.

Meanwhile, the function of outputting sounds is implemented in, for example, a speaker, which outputs sounds supplied from the system in an ear of the user wearing the user device 10. The audio input/output unit 120 may include a D/A converter for converting audio data supplied from the system into an analog audio signal, and an amplifier circuit for amplifying the audio signal. The function of outputting sounds may be implemented in, for example, a bone-conduction speaker.

(3) Location Information Acquisition Unit 130

The location information acquisition unit 130 has the function of acquiring location information which indicates a current location of the user device 10. For example, the location information acquisition unit 130 receives radio waves from a global positioning system (GPS) satellite to detect a location where the user device 10 is present, and outputs the detected location information. Note that the location information acquisition unit 130 is an example of a location information acquisition unit for detecting a location of the user device 10 on the basis of an externally acquired signal, and the location information acquisition unit according to this embodiment is not limited to this example. For example, the location information acquisition unit may detect the location using Wi-Fi, transmission/reception with a mobile telephone, PHS, smartphone, or the like, short-distance communication, or the like.

(4) Sensor Unit 140

The sensor unit 140 has the function of acquiring an action or state of the user. For example, the sensor unit 140 may be implemented in a sensor for observing the user and a situation around the user, such as a camera, infrared sensor, photosensor, or the like. Alternatively, the sensor unit 140 may be implemented in a sensor for acquiring biological information of the user, such as a myoelectric sensor, nerve sensor, pulse sensor, body temperature sensor, or the like. Also, the sensor unit 140 may be implemented in a sensor for acquiring action information of the user, such as a gyroscopic sensor, acceleration sensor, or the like.

(5) Control Unit 150

The control unit 150 functions as a computation apparatus and a control apparatus, and controls all operations of the user device 10 in accordance with various programs. The control unit 150 is implemented in an electronic circuit such as, for example, a central processing unit (CPU), microprocessor, or the like. Note that the control unit 150 may include a read only memory (ROM) for storing programs used, computation parameters, and the like, and a random access memory (RAM) for temporarily storing parameters which are changed as appropriate, and the like.

For example, the control unit 150 according to this embodiment controls the wireless communication unit 110 to transmit the identification information of the user to the output apparatus 20 located therearound. Also, the control unit 150 controls the audio input/output unit 120 so that the audio input/output unit 120 accepts the input of a passcode from the user, and controls the wireless communication unit 110 so that the wireless communication unit 110 transmits the input passcode to the server 30. The passcode is not limited to a sound of the teeth, and may be, for example, a sound made by the tongue, gesture, facial expression, or the like. The control unit 150 may be notified of the type of information which is to be detected as a passcode (a sound of the teeth, a sound of the tongue, etc.), and a period of time during which the detection is to be performed, by the server 30, and may detect a passcode on the basis of the notification. The period of time may be the same as that during which an authentication code is being output.

2-3. Configuration Examples of Output Apparatus

Figure 4:
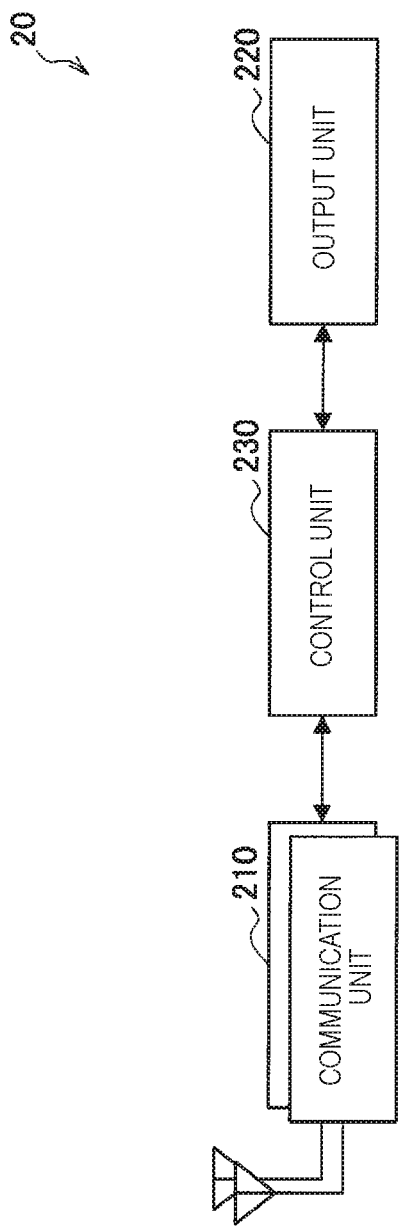
FIG. 4 is a block diagram showing a logical configuration example of an output apparatus according to the present embodiment.

FIG. 4 is a block diagram showing a logical configuration example of the output apparatus 20 according to this embodiment. As shown in FIG. 4, the output apparatus 20 includes a communication unit 210, an output unit 220, and a control unit 230.

(1) Communication Unit 210

The communication unit 210 is a communication module which transmits and receives data to and from an external apparatus in a wired or wireless manner. The communication unit 210 wirelessly communicates with an external apparatus, directly or through a network access point, in accordance with a scheme such as, for example, a mobile communication network, a wireless LAN, Wi-Fi, infrared communication, Bluetooth, NFC or the like.

For example, the communication unit 210 wirelessly communicates with the user device 10. For this wireless communication, a short-distance wireless communication scheme may be employed, such as, for example, infrared communication, Bluetooth, NFC, or the like. By this wireless communication, for example, the identification information of the user is received from the user device 10 located near the output apparatus 20. The communication unit 210 transmits and receives, for example, a signal for finding an apparatus, and receives identification information from the user device 10 which has been found within a predetermined distance. A short-distance wireless communication modem may always be in a state in which it can perform communication. Note that the communication unit 210 may have a short-distance wireless communication antenna which has a strong directivity with respect to the direction of the display screen of the output apparatus 20. In this case, the output apparatus 20 can avoid communication or provision of information with respect to the user device 10 of the user who is located behind or beside the output apparatus 20, so that it is difficult for the user to accept the provision of information from the display screen. As a result, the output apparatus 20 can concentrate on communication or provision of information with respect to the user device 10 of the user who is located in front of the output apparatus 20, so that it is easy for the user to accept the provision of information from the display screen.

Also, the communication unit 210 communicates with the server 30 through the network 60 using a wired or wireless communication scheme, such as, for example, a mobile communication network, a wired LAN, a wireless LAN, Wi-Fi, a telephone line, or the like. By this communication, for example, the identification information of the user located in front of the output apparatus 20 is transmitted to the server 30, and also, an authentication code and provision information are received from the server 30.

(2) Output Unit 220

The output unit 220 outputs information received from the server 30 in the form of a video, image, audio, or the like. The output unit 220 is implemented in, for example, a cathode ray tube (CRT) display apparatus, liquid crystal display apparatus, speaker, or the like.

For example, the output unit 220 may function as a provision unit which provides an authentication code (specific information) specific to a user. The authentication code is an output pattern previously set by a user, and may have various forms. For example, the authentication code may be an image of a point which flickers in red, changes to blue and turns clockwise, and finally changes to yellow and fades out, as described above with reference to FIG. 1. Alternatively, the authentication code may be, for example, a sound having a short melody (jingle) or the like, a pattern of vibrations of a seat on which a user is sitting, or the like. Also, the name or the like of a user may be played back as the authentication code if it has a low volume or a directivity such that it cannot be heard by other people. The authentication code is provided in a form which makes it difficult to recognize that it is really an authentication code, or which makes it difficult for people other than a user who has set the authentication code to recognize to which user the authentication code is directed. Therefore, even if the authentication code is output on the output apparatus 20 in full view of other people, the privacy of the user can be protected.

For example, the output unit 220 may function as a provision unit which provides provision information to users. The provision information may be output as an image including, for example, characters or the like, or as a sound. Note that, in the output apparatus 20, there are separate output units 220, one for providing an authentication code and the other for providing provision information. Also, different output apparatuses 20 may output an authentication code and provision information separately.

(3) Control Unit 230

The control unit 230 functions as a computation apparatus and a control apparatus, and controls all operations of the output apparatus 20 in accordance with various programs. The control unit 230 is implemented in an electronic circuit such as, for example, a CPU, microprocessor, or the like. Note that the control unit 230 may include ROM for storing programs used, computation parameters, and the like, and RAM for temporarily storing parameters which are changed as appropriate, and the like.

For example, the control unit 230 according to this embodiment controls the communication unit 210 so that the communication unit 210 receives the identification information of a user from the user device 10 located in front of the output apparatus 20. Also, the control unit 230 controls the communication unit 210 so that the communication unit 210 transmits a method for identifying a user to the server 30, and receives an authentication code from the server 30, and controls the output unit 220 so that the output unit 220 outputs the authentication code. When the user's approval has been given, the control unit 230 controls the communication unit 210 so that the communication unit 210 receives provision information from the server 30, and controls the output unit 220 so that the output unit 220 outputs the provision information.

2-4. Configuration Examples of Server

Figure 5:
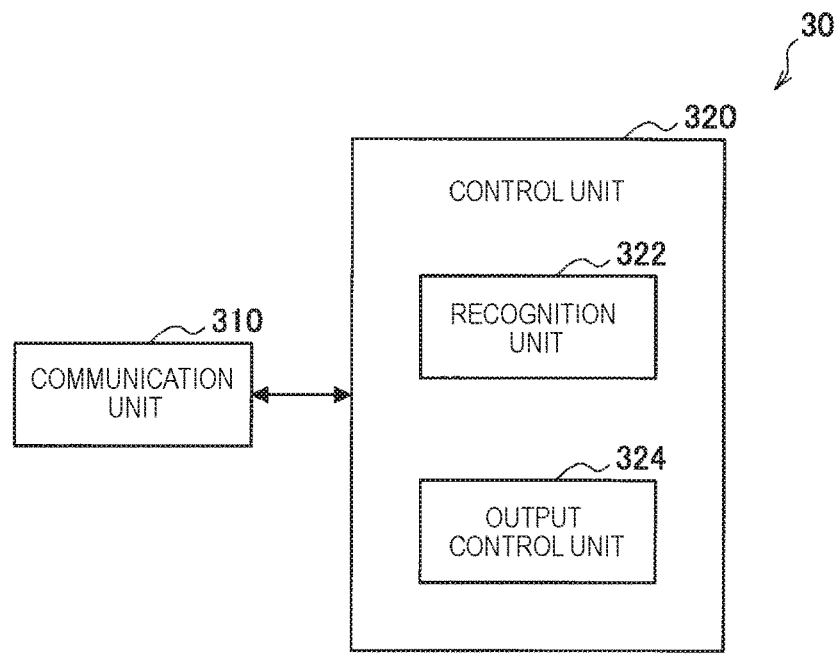
FIG. 5 is a block diagram showing a logical configuration example of a server according to the present embodiment.

FIG. 5 is a block diagram showing a logical configuration example of the server 30 according to this embodiment. As shown in FIG. 5, the server 30 includes a communication unit 310 and a control unit 320.

(3) Communication Unit 310

The communication unit 310 is a communication module which transmits and receives data to and from an external apparatus in a wired or wireless manner. The communication unit 310 wirelessly communicates with an external apparatus, directly or through a network access point, in accordance with a scheme such as, for example, a mobile communication network, a wireless LAN, Wi-Fi, infrared communication, Bluetooth, NFC or the like.

For example, the communication unit 310 transfers the identification information of a user received from the output apparatus 20 to the user information DB 40, and transfers an authentication code received from the user information DB 40 to the output apparatus 20. Also, the communication unit 310 transfers a passcode received from the user device 10 to the user information DB 40. Also, the communication unit 310 transfers provision information received from the provision information DB 50 to the output apparatus 20. Note that the communication unit 310 can be considered as a provision unit which provides an authentication code and provision information to a user.

(2) Control Unit 320

The control unit 320 functions as a computation apparatus and a control apparatus, and controls all operations of the server 30 in accordance with various programs. The control unit 320 is implemented in an electronic circuit such as, for example, a CPU, microprocessor, or the like. Note that the control unit 320 may include ROM for storing programs used, computation parameters, and the like, and RAM for temporarily storing parameters which are changed as appropriate, and the like. As shown in FIG. 5, the control unit 320 may function as a recognition unit 322 and an output control unit 324.

(2-1) Recognition Unit 322

The recognition unit 322 has the function of recognizing a user. For example, the recognition unit 322 recognizes a user on the basis of identification information which is received from the user device 10 through the output apparatus 20. Alternatively, the recognition unit 322 may recognize a user by, for example, performing facial recognition on a captured image of the user located in front of the output apparatus 20, which is captured by a camera of the output apparatus 20. Alternatively, the recognition unit 322 may recognize a user using a technique such as a fingerprint of a user touching the output apparatus 20, intra-body communication, a body area network, or the like. When the recognition unit 322 recognizes a user, the information providing system 1 can output an authentication code corresponding to the user, or output provision information.

In particular, the recognition unit 322 recognizes a user who is located within a range which allows the user to recognize provision information from the output apparatus 20 which provides the provision information. For example, the recognition unit 322 recognizes a user who is located in front of the output apparatus 20, on the basis of a signal from the user device 10 which is received by a short-distance wireless communication antenna which has a strong directivity with respect to the direction of the display screen of the output apparatus 20. Alternatively, for example, the recognition unit 322 may recognize a user who is a short distance from the output apparatus 20, as a user who can recognize provision information. The distance between the output apparatus 20 and a user may be calculated on the basis of, for example, the reception intensity or arrival delay amount of a wireless signal transmitted from the user device 10 in the output apparatus 20.

Also, the recognition unit 322 recognizes a user's approval on the basis of whether or not the user's action matches an action pattern previously set (passcode). The recognition unit 322 transmits a passcode received from the user device 10 to the user information DB 40 through the communication unit 310, and checks whether or not the passcode matches any passcode registered in the user information DB 40. Thereafter, if there is a match, the recognition unit 322 recognizes that the user's approval has been given. Otherwise, the recognition unit 322 recognizes that the user has refused. For example, the recognition unit 322 recognizes a user's approval on the basis of a sound of the user's teeth. Specifically, the recognition unit 322 checks whether or not a rhythmic sound made by the teeth matches any rhythm registered in the user information DB 40, and recognizes a user's approval.

The recognition unit 322 may recognize a plurality of users. For example, where a plurality of users who are wearing their respective user devices 10 are present around the output apparatus 20, each user is recognized on the basis of identification information received from the corresponding user device 10 through the output apparatus 20.

(2-2) Output Control Unit 324

The output control unit 324 has the function of controlling the output apparatus 20 so that the output apparatus 20 provides an authentication code corresponding to a user recognized by the recognition unit 322. For example, the output control unit 324 checks whether or not provision information which is to be provided to a user recognized by the recognition unit 322 is stored in the provision information DB 50, using the identification information of the user is a search key. If any provision information that is to be provided is found, the output control unit 324 acquires an authentication code from the user information DB 40, and controls the output apparatus 20 so that the output apparatus 20 outputs the authentication code.

Note that a plurality of authentication codes may be set for each user. For example, the output control unit 324 may cause the output apparatus 20 to output a corresponding authentication code on the basis of the level of priority which is determined according to the level of urgency, importance, or the like of provision information. In this case, users can find the level of priority of provision information, without viewing any detailed information about the provision information, on the basis of an authentication code the meaning of which is difficult for other people to recognize.

Also, the output control unit 324 functions as a control unit which controls the output apparatus 20 so that the output apparatus 20 provides provision information to a user according to the user's approval recognized by the recognition unit 322. When the user's approval has been recognized by the recognition unit 322, the output control unit 324 acquires provision information from the provision information DB 50, and transfers the provision information to the output apparatus 20.

When a plurality of users have been recognized by the recognition unit 322, the output control unit 324 controls how provision information is provided to each user by the output apparatus 20. For example, the output control unit 324 may select a user to which provision information is to be provided, on the basis of the distance between the output apparatus 20 and each recognized user and the level of priority of the provision information, and perform an authentication process on the selected user and output the provision information to the selected user. For example, the output control unit 324 outputs an authentication code and provision information only to a user(s) who is located nearer the output apparatus 20 and has provision information having a higher level of priority. Alternatively, the output control unit 324 may control the order in which provision information is provided so that the order is the same as the order in which users' approvals have been obtained. For example, the output control unit 324 may output provision information in the order in which users have passed the checking of a passcode. In this case, a user can have the output apparatus 20 all to themselves to accept the provision of provision information. The output control unit 324 may output authentication codes for respective users sequentially, and output provision information to a user who has passed the checking of a passcode while outputting authentication codes.

Here, the output control unit 324 may remove, under predetermined conditions, the authentication process including provision of an authentication code and a user's approval using the input of a passcode. When there is little possibility that privacy is invaded, the output control unit 324 can remove the authentication process, and can more easily provide provision information.

For example, the output control unit 324 may determine whether or not the authentication process is to be removed, on the basis of whether or not the output apparatus 20 is associated with a user. For example, when the output apparatus 20 is previously registered as a safe apparatus which is, for example, possessed by a user themselves or a user's family, in association with the user, the output control unit 324 may remove the authentication process. The output control unit 324 determines whether or not the output apparatus 20 is associated with a user, by referring to the user information DB 40.

For example, the output control unit 324 may determine whether or not the authentication process is to be removed, on the basis of the location of the output apparatus 20 or a relationship between the output apparatus 20 and a user. For example, when the output apparatus 20 is located in a user's home, or a hotel room where a user stays, the output control unit 324 may remove the authentication process. The output control unit 324 determines whether or not the output apparatus 20 is located in a place where the privacy of a user can be protected, by referring to the user information DB 40.

For example, the output control unit 324 may determine whether or not the authentication process is to be removed, on the basis of the attribute information of people located around a user. For example, when other users located around a user are the user's family members or close friends, the output control unit 324 may remove the authentication process. The output control unit 324 may acquire an interpersonal relationship between users by referring to the user information DB 40. Also, the attribute information of other users which is used by the output control unit 324 as a basis for determining whether or not the authentication process is to be removed, may include language information indicating what language they can understand. For example, when provision information which is to be provided to a user is in Japanese, then if people located around the user cannot understand the Japanese language, the output control unit 324 may remove the authentication process.

Also, the output control unit 324 may process provision information according to a situation around the output apparatus 20. For example, when other people are present around the output apparatus 20, the output control unit 324 controls the output apparatus 20 so that provision information is provided to a user while personally identifiable information of the user is concealed. For example, the output control unit 324 processes provision information so that personally identifiable information of a user, such as the user's name, address, and the like, is written in meaningless symbols. Also, the output control unit 324 may control the output apparatus 20 so that personally identifiable information which has been concealed is disclosed, according to a user's instruction. For example, the output control unit 324 restores a content concealed by meaningless symbols to the original one according to a user's instruction. For example, the recognition unit 322 may recognize a user's instruction to disclose concealed personally identifiable information, for example, on the basis of information acquired by the audio input/output unit 120 or the sensor unit 140 of the user device 10. Alternatively, a user's instruction may be accepted by the output apparatus 20. For example, a user's instruction may be accepted by touching a portion of the display screen including a touch panel of the output apparatus 20 where meaningless symbols are displayed.

In the foregoing, configuration examples of the information providing system 1 according to this embodiment have been described. Next, operation process examples of the information providing system 1 according to this embodiment will be described with reference to FIG. 6 to FIG. 14.

3. Operation Process

3-1. Operation Example 1

This operation example is a basic operation example in which provision information is provided to a single user after the authentication process. The operation of the information providing system 1 may be divided into a preliminary process of accepting preliminary registration of information by a user, and an information providing process of providing provision information to a user located close to the output apparatus 20. The preliminary process and the information providing process will now be described sequentially with reference to FIG. 6 and FIG. 7.

(Preliminary Process)

Figure 6:
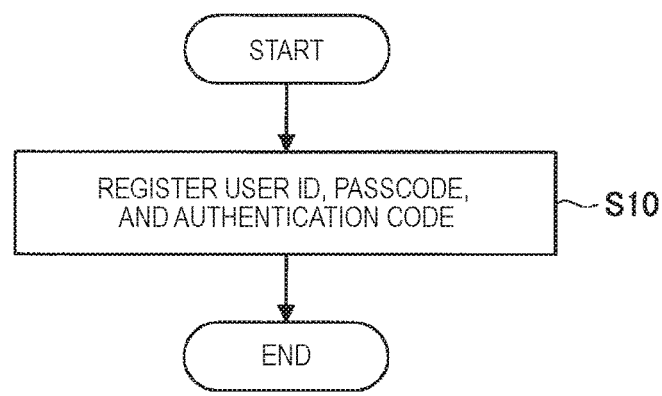
FIG. 6 is a flowchart showing an example of a flow of a preliminary process by the information providing system according to the present embodiment.

FIG. 6 is a flowchart showing an example of a flow of the preliminary process by the information providing system 1 according to this embodiment. As shown in FIG. 6, in step S10, the information providing system 1 registers a user ID (identification information), a passcode, and an authentication code. For example, a user inputs these items of information by operating the setting terminal 70, so that the user information DB 40 stores the input information. A user may register a plurality of combinations of a passcode and an authentication code, and may designate an authentication code to be output for each level of priority of provision information.

(Information Providing Process)

Figure 7:
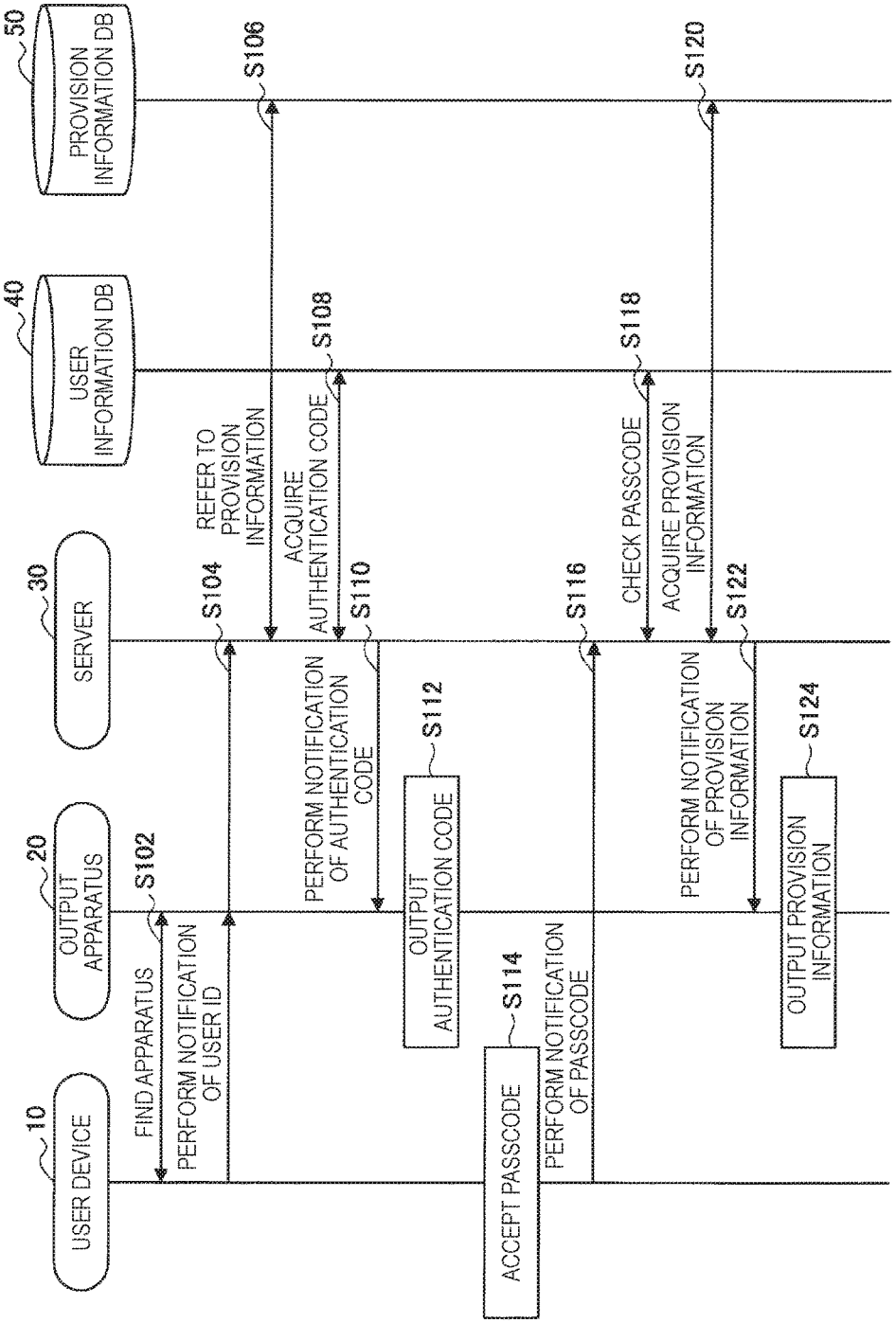
FIG. 7 is a sequence diagram showing an example of a flow of an information providing process by the information providing system according to the present embodiment.

FIG. 7 is a sequence diagram showing an example of a flow of the information providing process by the information providing system 1 according to this embodiment. The sequence shown in FIG. 7 is involved with the user device 10, the output apparatus 20, the server 30, the user information DB 40, and the provision information DB 50.

As shown in FIG. 7, initially, in step S102, the user device 10 and the output apparatus 20 find each other. For example, the user device 10 and the output apparatus 20 find each other by receiving a signal for finding an apparatus from the other and then transmitting a response signal to the other.

Next, in step S104, the user device 10 transmits a user ID to the server 30 through the output apparatus 20.

Next, in step S106, the server 30 refers to the provision information DB 50 in order to check the presence or absence of provision information which is to be provided to the user. For example, the server 30 queries the provision information DB 50 using the user ID received in step S104 as a search key in order to check the presence or absence of provision information for the user of the user device 10. Here, it is assumed that there is provision information which is to be provided to the user.

Next, in step S108, the server 30 acquires an authentication code by referring to the user information DB 40. In this case, the server 30 may acquire an authentication code according to the level of priority of provision information or the like.

Next, in step S110, the server 30 transmits the acquired authentication code to the output apparatus 20.

Next, in step S112, the output apparatus 20 outputs the received authentication code. At this time, the output apparatus 20 may output the authentication code in a partial region of the screen in a manner which allows the authentication code to avoid blocking main contents being displayed, for example. The region where the authentication code is output is desirably located at a position which allows the authentication code to be noticeable. The user can recognize the authentication code for themselves which is displayed in a portion of the screen of the output apparatus 20. Meanwhile, it is difficult for other people around the output apparatus 20 to recognize that the displayed object is an authentication code, or to which user the authentication code is directed, and therefore, the privacy of the user can be protected.

Next, in step S114, the user device 10 accepts the input of a passcode from the user. For example, the user checks the authentication code output on the output apparatus 20, and then checks the surrounding area to determine whether or not it is safe for provision information to be output on the output apparatus 20, and inputs a passcode. For example, the user inputs a passphrase by making a sound by causing the teeth to knock together to a rhythm previously registered in the user information DB 40. The user device 10 acquires a passphrase through the audio input/output unit 120. The input of a passcode may be accepted only during a period of time when an authentication code is being displayed, for example.

Next, in step S116, the user device 10 notifies the server 30 of the passcode. For example, the user device 10 transmits the passcode to the server 30 using the wireless communication unit 110. The user device 10 may transmit the passcode to the server 30 directly using a mobile communication network or the like, or may transmit the passcode to the server 30 through short-distance wireless communication with the output apparatus 20.

Next, in step S118, the server 30 checks the received passcode. Specifically, the recognition unit 322 transfers the passcode received from the user device 10 to the user information DB 40 through the communication unit 310, and checks the passcode against passcodes registered in the user information DB 40. Here, it is assumed that the input passcode matches a registered passcode, and the user's approval has been given.

Next, in step S120, the server 30 acquires provision information from the provision information DB 50. Specifically, the output control unit 324 acquires provision information for the user from the provision information DB 50 using the communication unit 310.

Next, in step S122, the server 30 notifies the output apparatus 20 of the acquired provision information.

Thereafter, in step S124, the output apparatus 20 outputs the provision information received from the server 30. As a result, the user can view the provision information output on the output apparatus 20 after the user's own approval. Meanwhile the output apparatus 20 continues to communicate with the user device 10, and when detecting that the distance between the output apparatus 20 and the user is a predetermined distance or more, using a short-distance wireless communication technique, may stop outputting the provision information.

3-2. Operation Example 2

This operation example is an operation example where a plurality of users are located close to the output apparatus 20. Here, it is assumed that a user A wearing a user device 10A and a user B wearing a user device 10B are located close to the front side of the screen of the output apparatus 20. This operation example will now be described with reference to FIG. 8. Note that the preliminary process is as described above with reference to FIG. 6, and therefore, will not be described again, and the information providing process will be described.

Figure 8:
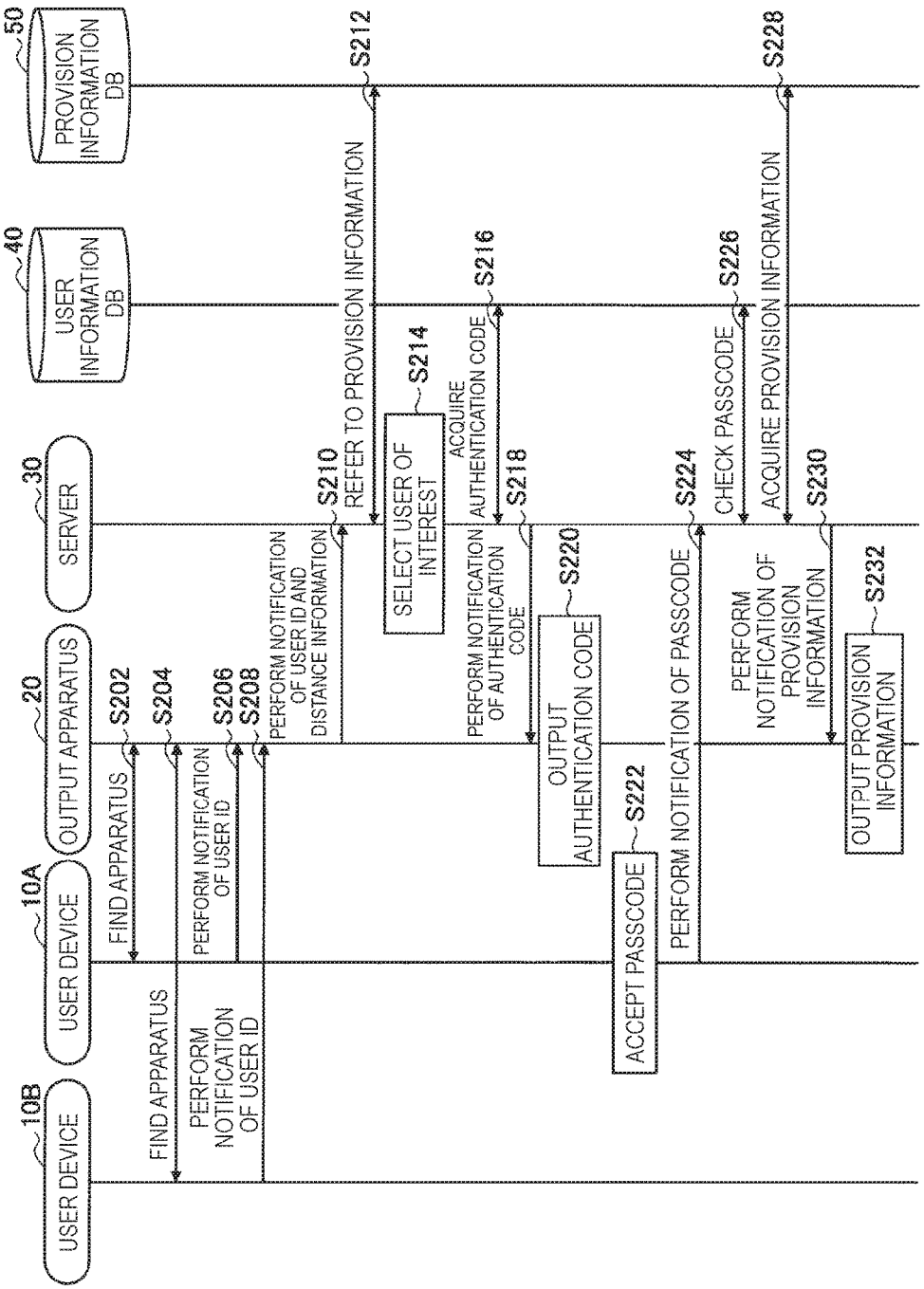
FIG. 8 is a sequence diagram showing an example of a flow of an information providing process by the information providing system according to the present embodiment.

FIG. 8 is a sequence diagram showing an example of a flow of the information providing process by the information providing system 1 according to this embodiment. The sequence shown in FIG. 8 is involved with the user devices 10A and 10B, the output apparatus 20, the server 30, the user information DB 40, and the provision information DB 50.

As shown in FIG. 8, initially, in step S202, the user device 10A and the output apparatus 20 find each other. Also, in step S204, the user device 10B and the output apparatus 20 find each other.

Next, in step S206, the user device 10A transmits the user ID of the user A to the output apparatus 20. Similarly, in step S208, the user device 10B transmits the user ID of the user B to the output apparatus 20. At this time, the control unit 230 of the output apparatus 20 calculates the distance between the output apparatus 20 and each user device 10 on the basis of the signal intensity of a wireless signal of short-distance wireless communication received by the communication unit 210, the amount of a delay in arrival of the wireless signal, or the like.

Next, in step S210, the output apparatus 20 transmits, to the server 30, each received user ID and distance information indicating the calculated distances from the user device 10.

Next, in step S212, the server 30 refers to the provision information DB 50 in order to check the presence or absence of provision information which is to be provided to the users. Here, it is assumed that there are information which is to be provided to both of the user A and the user B.

Next, in step S214, the server 30 selects a user of interest to whom information is to be provided. Specifically, the output control unit 324 selects a user of interest on the basis of the distance between the output apparatus 20 and each user device 10, and the level of priority of provision information for each user.

Processes in the following steps S216-S232 are similar to those in steps S108-S124 described above with reference to FIG. 7. In an example shown in FIG. 8, shown are the authentication process for the user A and the process of outputting provision information which are performed when, in step S214, the user A has been selected as a user of interest. For example, the server 30 acquires an authentication code for the user A (S216), and the output apparatus 20 outputs the authentication code for the user A (S220). Next, when the user device 10A accepts the input of a passcode from the user A (S222), the server 30 checks the passcode of the user A (S226). Thereafter, the server 30 acquires provision information for the user A (S228), and outputs the provision information for the user A (S232).

3-3. Operation Example 3

This operation example is an operation example where a plurality of users are located close to the output apparatus 20. Here, it is assumed that a user A wearing a user device 10A and a user B wearing a user device 10B are located close to the front side of the screen of the output apparatus 20. This operation example will now be described with reference to FIG. 9. Note that the preliminary process is as described above with reference to FIG. 6, and therefore, will not be described again, and the information providing process will be described.

Figure 9:
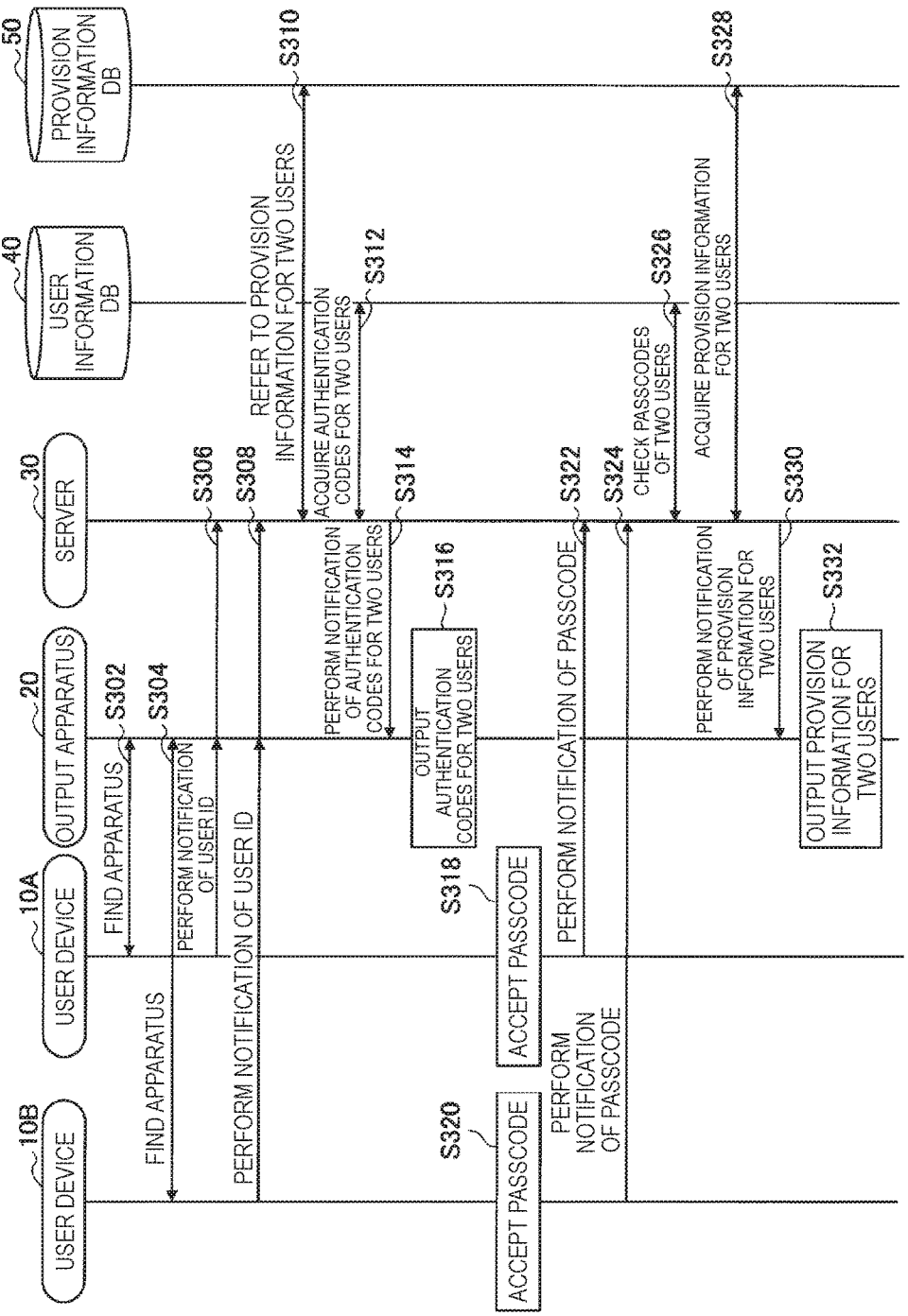
FIG. 9 is a sequence diagram showing an example of a flow of an information providing process by the information providing system according to the present embodiment.

FIG. 9 is a sequence diagram showing an example of a flow of the information providing process by the information providing system 1 according to this embodiment. The sequence shown in FIG. 9 is involved with the user devices 10A and 10B, the output apparatus 20, the server 30, the user information DB 40, and the provision information DB 50.

As shown in FIG. 9, initially, in steps S202 and S204, the user device 10A and the output apparatus 20, and the output apparatus 20, find each other. Next, in steps S206 and S208, the user device 10A and the output apparatus 20 transmit their user IDs to the output apparatus 20.

Next, in step S310, the server 30 refers to the provision information DB 50 in order to check the presence or absence of provision information which is to be provided to the users A and the user B. Here, it is assumed that there are provision information which is to be provided to both of the user A and the user B.

Next, in step S312, the server 30 acquires authentication codes for two users, i.e., the user A and the user B, by referring to the user information DB 40. Next, in step S314, the server 30 transmits the authentication codes thus acquired for the two users to the output apparatus 20. Next, in step S316, the output apparatus 20 outputs the authentication codes thus received for the two users. At this time, the output apparatus 20 may present an authentication code corresponding to provision information having a higher level of priority, as a display at a more noticeable position/louder sound, according to the level of priority of provision information for each user.

Next, in step S318, the user device 10A accepts the input of a passcode from the user A. Similarly, in step S320, the user device 10B accepts the input of a passcode from the user B.

Next, in step S322, the user device 10A notifies the server 30 of the passcode of the user A. Similarly, in step S324, the user device 10B notifies the server 30 of the passcode of the user B.

Next, the server 30 checks the passcodes of two users, i.e., the user A and the user B, in step S326, acquires provision information for the two users from the provision information DB 50 in step S328, and transmits the provision information thus acquired for the two users to the output apparatus 20 in step S330.

Thereafter, in step S332, the output apparatus 20 outputs the provision information for the two users. At this time, the output apparatus 20 may output the provision information for the two users concurrently in, for example, separate display regions. Alternatively, the output apparatus 20 may output the provision information in the order in which the users' approvals have been given, under the control of the server 30. Also, the output apparatus 20 may process and output personally identifiable information of the provision information in the form of meaningless symbols, or restore and output personally identifiable information in the form of meaningless symbols to the original form according to a user's instruction, for example.

3-4. Operation Example 4

Figure 10:
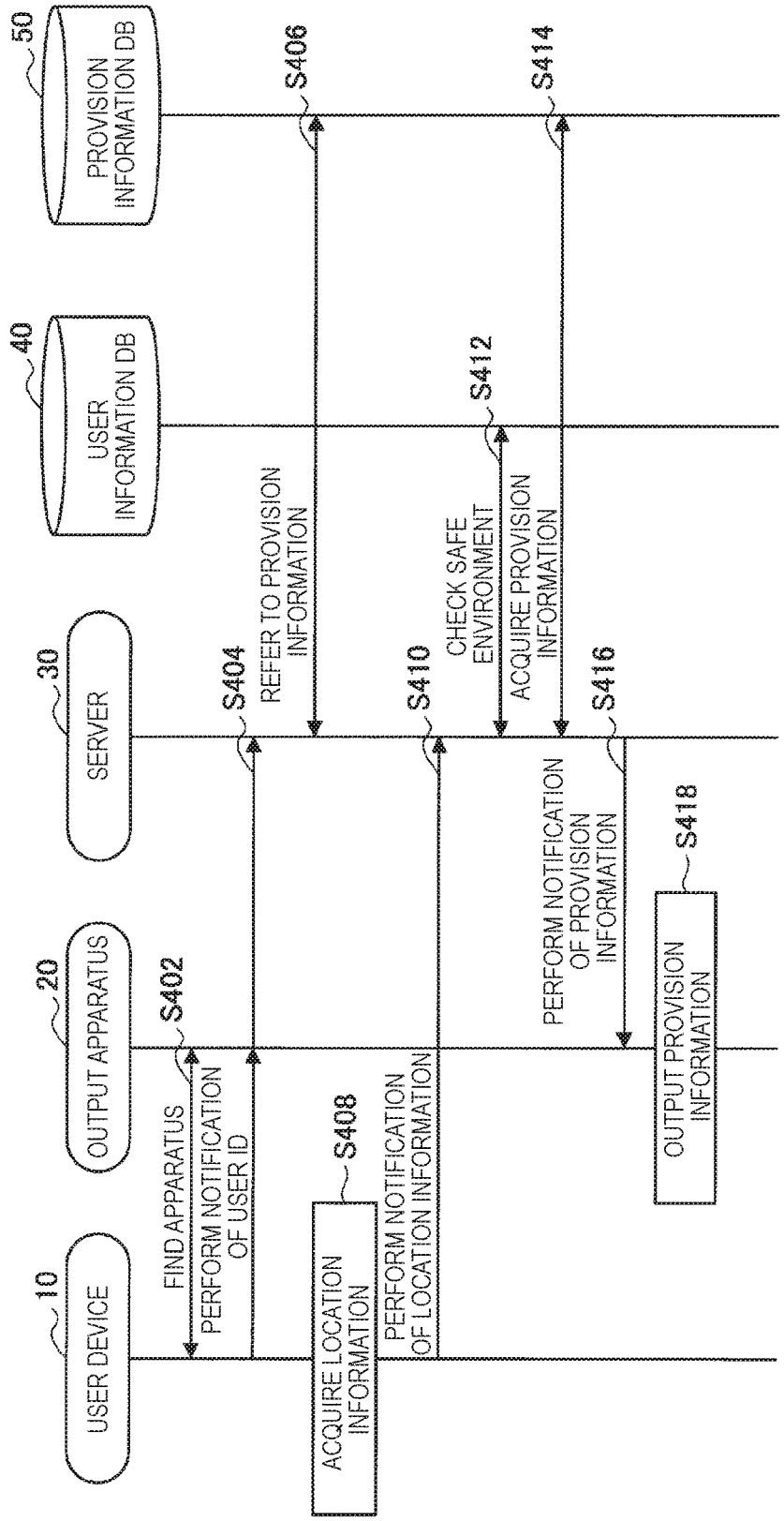
FIG. 10 is a sequence diagram showing an example of a flow of an information providing process by the information providing system according to the present embodiment.
Figure 11:
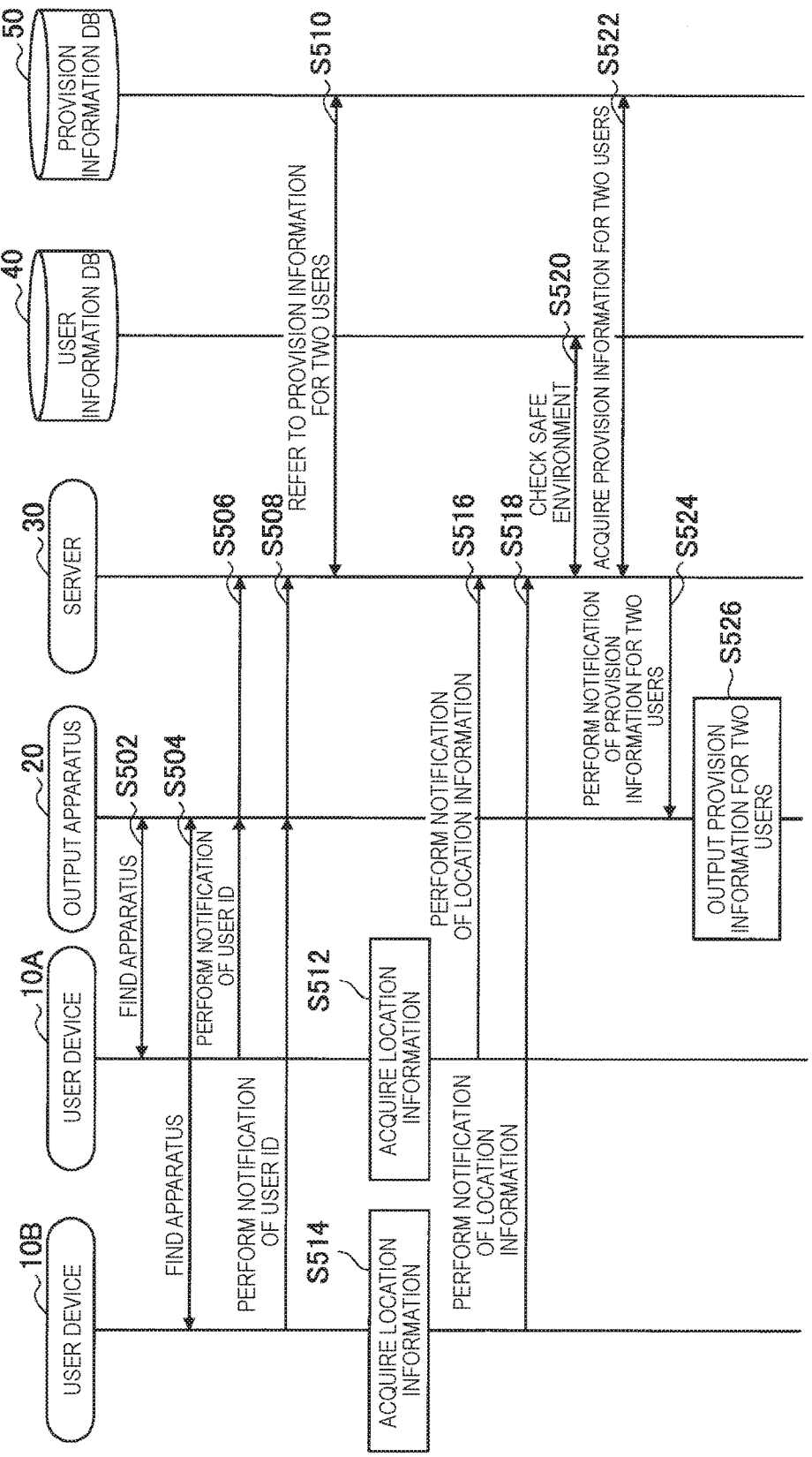
FIG. 11 is a sequence diagram showing an example of a flow of an information providing process by the information providing system according to the present embodiment.

This operation example is an operation example where the authentication process is removed after confirming that a user is in a safe environment. This operation example will be described with reference to FIGS. 10 to 12. FIG. 10 shows an operation example where a single user is located closer to the output apparatus 20. FIG. 11 shows an operation example where a plurality of users are located close to the output apparatus 20. Note that the preliminary process is as described above with reference to FIG. 6, and will not be described again, and the information providing process will be described.

(Information Providing Process)

FIG. 10 is a sequence diagram showing an example of a flow of the information providing process by the information providing system 1 according to this embodiment. The sequence shown in FIG. 10 is involved with the user device 10, the output apparatus 20, the server 30, the user information DB 40, and the provision information DB 50.

As shown in FIG. 10, initially, in step S402, the user device 10 and the output apparatus 20 find each other. Next, in step S404, the user device 10 transmits the user ID to the server 30 through the output apparatus 20. Next, in step S406, the server 30 refers to the provision information DB 50 in order to check the presence or absence of provision information which is to be provided to the user.

Meanwhile, in step S408, the user device 10 acquires location information. For example, the user device 10 acquires location information indicating a current location using the location information acquisition unit 130. Thereafter, in step S410, the user device 10 transmits the acquired location information to the server 30. As a result, the server 30 can acquire the current location of a user. The acquired location information may be stored in the user information DB 40. Note that the server 30 may acquire the current location of a user in other manners. For example, when the output apparatus 20 and the user device 10 perform short-distance wireless communication, the user is located close to the output apparatus 20. Therefore, the server 30 can regard the installation location of the output apparatus 20 as the current location of the user, to obtain the location information.

Thereafter, in step S412, the server 30 checks whether or not the user is located in a safe environment, by referring to the user information DB 40. For example, when the output apparatus 20 is previously registered as a safe apparatus which is possessed by a user or the like, the output control unit 324 determines that the user is in a safe environment. Also, when a user is located in a safe place in terms of privacy, such as, for example, the user's home, a hotel room where the user stays, or the like, the output control unit 324 determines that the user is in a safe environment. When it is thus confirmed that the user is in a safe environment, the information providing system 1 can remove the authentication process as in steps S414-S418. As a result, for example, when a user only approaches a display at their home, provision information is displayed without the display of an authentication code or the input of a passcode. Note that processes in steps S414-S418 are similar to those in steps S120-S124 described above with reference to FIG. 7, and will not be described again.

FIG. 11 is a sequence diagram showing an example of a flow of the information providing process by the information providing system 1 according to this embodiment. The sequence shown in FIG. 11 is involved with the user devices 10A and 10B, the output apparatus 20, the server 30, the user information DB 40, and the provision information DB 50.

Processes in steps S502-S510 shown in FIG. 11 are similar to those in steps S302-S310 described above with reference to FIG. 9. Also, processes in steps S512-S518 are similar to those in steps S408-S410 described above with reference to FIG. 10.

Thereafter, in step S520, the server 30 checks whether or not a user is in a safe environment by referring to the user information DB 40. For example, when an interpersonal relationship between the user A and the user B is previously registered as a safe interpersonal relationship, such as that they are a family, close friends, or the like, the output control unit 324 determines that the user is in a safe environment. When it is thus confirmed that the user is in a safe environment, the information providing system 1 can remove the authentication process as shown in steps S522 to S526. As a result, for example, when a user only approaches a display at their home along with their family member, provision information for the user and their family is displayed without the display of an authentication code or the input of a passcode. Note that processes in steps S522-S526 are similar to those in steps S328-S332 described above with reference to FIG. 9, and will not be described again.

(Safety Checking Process)

Next, a determination logic for determining whether or not the output apparatus 20 is in an safe environment, which is performed by the server 30 in steps S412 and S520, will be described in detail with reference to FIG. 12.

Figure 12:
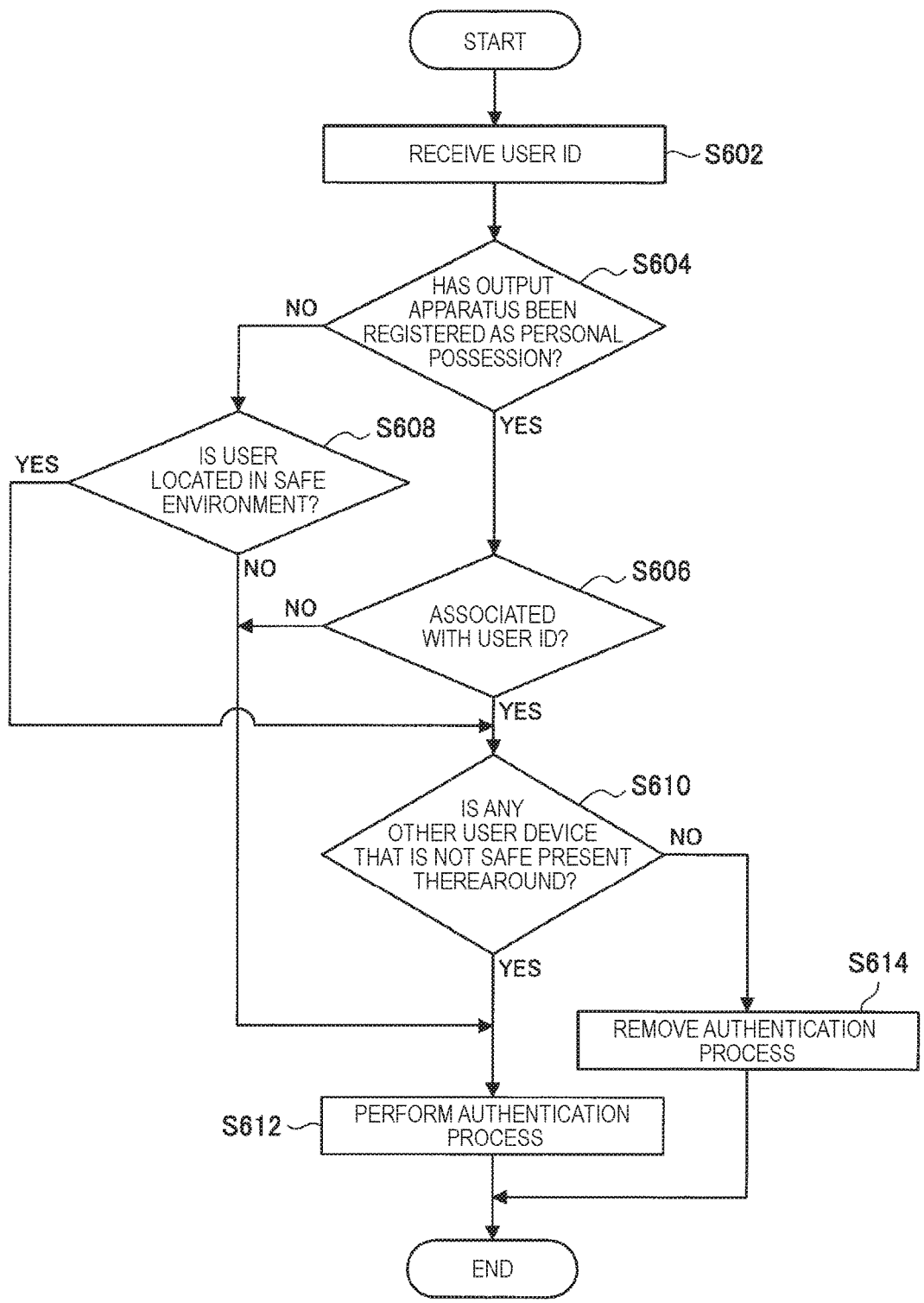
FIG. 12 is a flowchart showing an example of a flow of a safety checking process by the information providing system according to the present embodiment.

FIG. 12 is a flowchart showing an example of a flow of a safety checking process by the information providing system 1 according to this embodiment.

As shown in FIG. 12, initially, in step S602, the server 30 receives a user ID from the user device 10 through the output apparatus 20.

Next, in step S604, the server 30 determines whether or not the output apparatus 20 is previously registered as a personal possession. For example, the output control unit 324 acquires information indicating whether or not the output apparatus 20 which has relayed the user ID is previously registered as a personally possessed apparatus, by referring to the user information DB 40.

When the output apparatus 20 is previously registered as a personally possessed apparatus (S604/YES), the server 30 determines in step S606 whether or not the output apparatus 20 is associated with the received user ID. For example, the output control unit 324 determines whether or not the user ID of the owner of the output apparatus 20 matches the user ID received in step S602, or whether or not the user ID of the owner of the output apparatus 20 matches the user ID of a person who has a close interpersonal relationship, such as a family relationship or the like.

Meanwhile, when the output apparatus 20 is not previously registered as a personally possessed apparatus (S604/NO), the server 30 determines in step S608 whether or not the user is located in a safe environment. For example, the output control unit 324 determines whether or not the user is located in a safe environment, on the basis of whether or not the user is located in a safe place in terms of privacy, such as, for example, the user's home, a hotel room where the user stays, or the like.

When the output apparatus 20 is personally possessed and is associated with the user ID (S606/YES), or when the output apparatus 20 is not personally possessed and the user is in a safe environment (S608/YES), the server 30 determines in step S610 whether or not any other user device 10 that is not safe is present around the output apparatus 20. For example, the output control unit 324 determines whether or not a plurality of user IDs received through the output apparatus 20 are previously registered as user IDs having a safe interpersonal relationship, such as that they are a family or close friends, or the like, by referring to the user information DB 40.

When the output apparatus 20 is personally possessed and is not associated with the user ID (S606/NO), when the output apparatus 20 is not personally possessed and the user is not in a safe environment (S608/NO), or when another user device 10 that is not safe is present around the output apparatus 20 (S610/YES), the server 30 determines in step S612 to perform the authentication process.

Meanwhile, when any other user device 10 that is not safe is not present around the output apparatus 20 (S610/NO), the server 30 determines in step S614 to remove the authentication process.

3-5. Operation Example 5

This operation example is an operation example where a translation service is provided after a user's approval. The preliminary process and the information providing process involved in this operation example will now be described sequentially with reference to FIG. 13 and FIG. 14.

(Preliminary Process)

Figure 13:
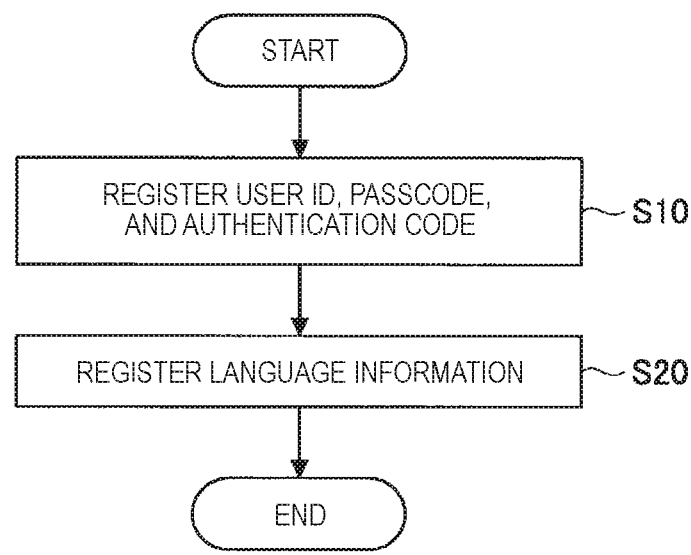
FIG. 13 is a flowchart showing an example of a flow of a preliminary process by the information providing system according to the present embodiment.

FIG. 13 is a flowchart showing an example of a flow of the preliminary process by the information providing system 1 according to this embodiment. As shown in FIG. 13, in step S10, the information providing system 1 registers a user ID, a passcode, and an authentication code. Next, in step S20, the information providing system 1 registers language information. For example, a user operates the setting terminal 70 to input language information indicating the language of the user's mother country and languages which the user can speak, and the user information DB 40 stores the input information.

(Information Providing Process)

Figure 14:
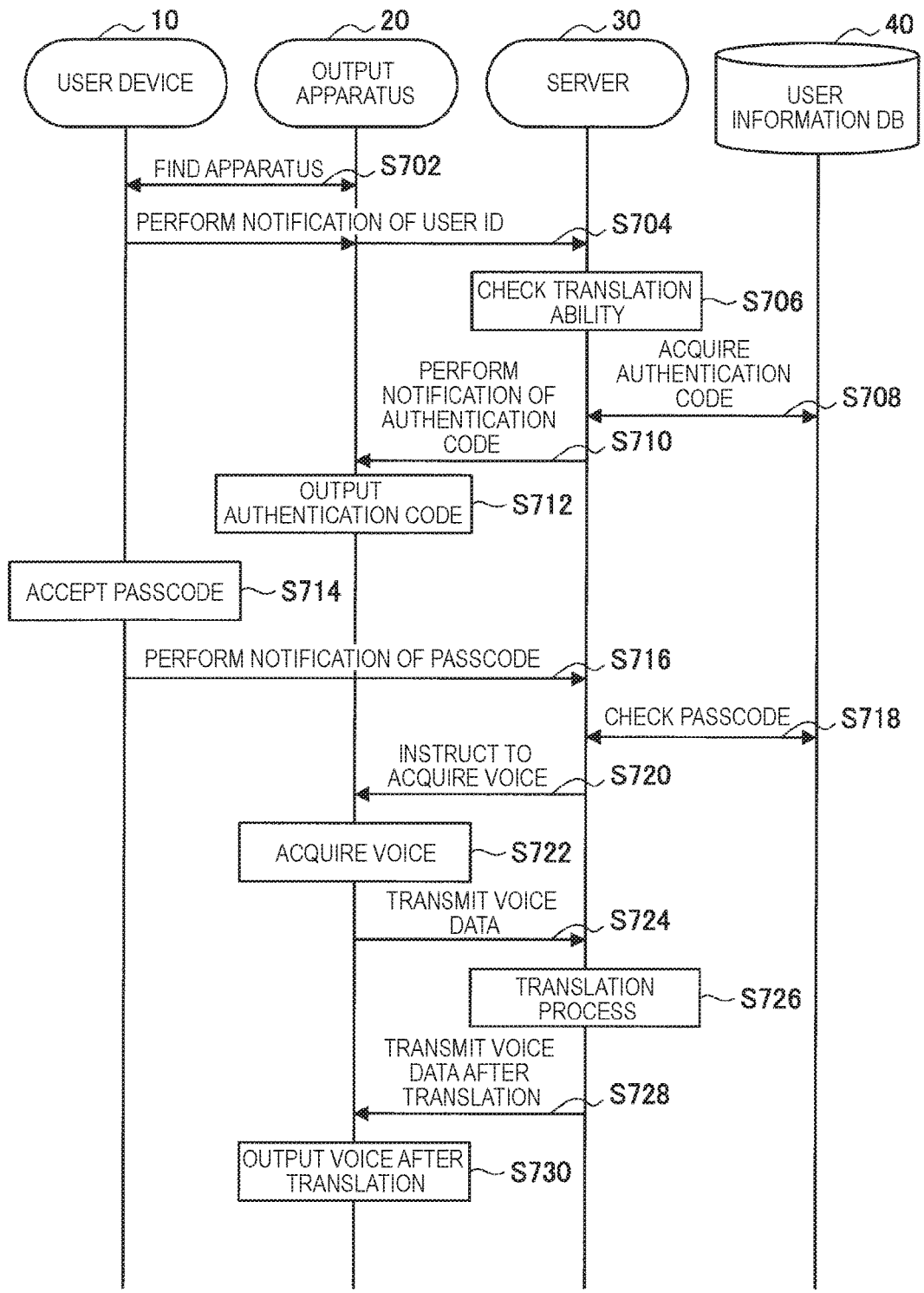
FIG. 14 is a sequence diagram showing an example of a flow of an information providing process by the information providing system according to the present embodiment.

FIG. 14 is a sequence diagram showing an example of a flow of the information providing process by the information providing system 1 according to this embodiment. The sequence shown in FIG. 14 is involved with the user device 10, the output apparatus 20, the server 30, and the user information DB 40.

As shown in FIG. 14, initially, in step S702, the user device 10 and the output apparatus 20 find each other. Next, in step S704, the user device 10 transmits the user ID to the server 30 through the output apparatus 20.

Next, in step S706, the server 30 checks translation ability. For example, the output control unit 324 determines whether or not translation can be performed between a language which is spoken in a place where the user is currently located and the language of the user's mother country, by referring to the user's language information from the user information DB 40. Here, it is assumed that the server 30 has translation ability.

The following processes in steps S708-S716 are similar to those in steps S108-S118 described above with reference to FIG. 7, and will not be described again.

Next, in step S720, the server 30 transmits an instruction to acquire voice to the output apparatus 20. As a result, in step S722, the output apparatus 20 starts acquiring voices thereaournd. Next, in step S724, the output apparatus 20 transmits the acquired voice data back to the server 30.

Next, in step S726, the server 30 performs a translation process. For example, the server 30 generates voice data obtained by translating a speech which has been spoken by the user in the language of the user's mother country into the language which is spoken in the location where the user is currently present. Also, for example, voice data is generated by translating a speech which has been spoken by a person who is talking with the user, such as a staff member in a restaurant or the like, in the local language, into the language of the user's mother country. Note that the voice after translation may be regarded as provision information.

Next, in step S728, the server 30 transmits the generated voice data after translation to the output apparatus 20.

Thereafter, in step S730, the output apparatus 20 outputs the received voice data after translation.

Note that it has been assumed above that the acquisition of voice data and the playback of voice data after translation are performed by the output apparatus 20. Alternatively, these tasks may be performed by the user device 10. In this case, only the user of the user device 10 can receive the translation service. In addition, when a staff member of a restaurant or the like is wearing the user device 10, the processes described above with reference to FIG. 14 may be performed for the user device 10 which is being worn by the restaurant staff member.

4. Conclusion

In the foregoing, embodiments of the technique according to the present disclosure have been described with reference to FIG. 1 to FIG. 14. According to the above embodiments, the information providing system recognizes a user, provides an authentication code specific to the recognized user, and provides provision information to the user according to the user's approval given to the authentication code. The information providing system can provide a service desired by a user at a timing desired by the user after the user's approval, i.e., can provide a customized service according to a user's context.

A user's approval is performed by inputting a previously set passcode. Therefore, the information providing system 1 can provide information only when a user has been identified, thereby avoiding inappropriately providing information to other people. Also, the authentication code is in a form which makes it difficult for people other than a user who has set the authentication code to recognize that the authentication code is really an authentication code, and therefore, it is difficult for other people to determine that there is provision information for the user, whereby the privacy of the user is protected. In addition, the passcode is in a form which makes it difficult for other people to recognize, such as a sound made by the teeth, whereby the privacy of the user is further protected.

Also, the information providing system 1 may remove the authentication process under predetermined conditions. For example, the information providing system 1 may remove the authentication process when a user is in a safe environment, such as when a user is at home, when provision information is provided on a device possessed by a user, or the like. Thus, when there is little possibility that privacy is invaded, the information providing system 1 can remove the authentication process, thereby more simply providing provision information.

In the recent society which is full of visually recognized information such as characters, video, and the like, users can accept the provision of information from the output apparatus 20 provided therearound, and therefore, it is not necessary to carry a display device. Also, even when a user forgets to carry a display device, the user can accept the provision of information.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiments, it has been assumed that the information providing system 1 includes the user device 10, the output apparatus 20, the server 30, the user information DB 40, and the provision information DB 50, and the apparatuses cooperate with each other. The present technology is not limited to these examples. For example, the technology according to the present disclosure may be implemented in the output apparatus 20 alone. Also, all or a portion of the functions of the user device 10, the output apparatus 20, and the server 30 may be provided in another apparatus(es).

Also, in the above embodiments, it has been assumed that users use user devices 10 which can receive and output audio. The present technology is not limited to these examples. For example, instead of the user device 10, a tag capable of storing identification information, such as a radio frequency identifier (RFID) or the like, may be used. In this case, when the output apparatus 20 reads the RFID, the server 30 can provide a corresponding authentication process and information to a user. The input of a passcode may be implemented, for example, by gesture recognition by a camera provided in the output apparatus 20 or inputting to a touch panel. In addition, no apparatus corresponding to the user device 10 may be used. In this case, for example, the output apparatus 20 identifies a user by facial recognition, fingerprint authentication, or the like.

Note that a series of processes by the respective apparatuses described herein may be implemented using any one of software, hardware, and a combination of hardware and software. For example, a program included in software is stored in a storage medium (a non-transitory medium) installed inside or outside each apparatus. For example, each program is read into a random access memory (RAM) for execution in a computer, and is executed by a processor, such as a central processing unit (CPU) or the like.

In addition, the processes described herein using the flowcharts and the sequence diagrams may not necessarily be executed in the order shown therein. Some process steps may be executed in parallel. Further, additional process steps may be employed, and some process steps may be removed.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing system including:

a recognition unit configured to recognize a user;

a provision unit configured to provide specific information specific to the user recognized by the recognition unit; and a control unit configured to control the provision unit so that the provision unit provides provision information to the user according to approval from the user.

(2)

The information processing system according to (1), wherein the control unit determines whether or not to remove the provision of the specific information and the approval from the user, on the basis of whether or not an output apparatus which is to be provided with the provision information is associated with the user.

(3)

The information processing system according to (2), wherein the control unit determines whether or not to remove the provision of the specific information and the approval from the user, on the basis of a relationship between a location of the output apparatus and the user.

(4)

The information processing system according to any one of (1) to (3), wherein the recognition unit recognizes a user who is located within a range which allows the user to recognize the provision information from an output apparatus which is to be provided with the provision information.

(5)

The information processing system according to any one of (1) to (4), wherein the control unit determines whether or not to remove the provision of the specific information and the approval from the user, on the basis of attribute information of a person located around the user.

(6)

The information processing system according to (5), wherein the attribute information includes language information indicating a language which the person can understand.

(7)

The information processing system according to any one of (1) to (6), wherein the recognition unit recognizes the approval from the user on the basis of whether or not an action of the user matches a predetermined action pattern.

(8)

The information processing system according to any one of (1) to (7), wherein the recognition unit recognizes the approval from the user on the basis of a sound made by the user's teeth.

(9)

The information processing system according to any one of (1) to (8), wherein the specific information is an output pattern previously set by the user.

(10)

The information processing system according to any one of (1) to (9), wherein the control unit controls the provision unit so that the provision unit provides the provision information while concealing personally identifiable information of the user included in the provision information.

(11)

The information processing system according to (10), wherein the control unit controls the provision unit so that the provision unit discloses personally identifiable information concealed according to an instruction from the user recognized by the recognition unit.

(12)

The information processing system according to any one of (1) to (11), wherein, when the recognition unit recognizes a plurality of users, the control unit controls a provision form of the provision information which is provided to each of the users by the provision unit.

(13)

The information processing system according to (12), wherein the control unit selects the user to whom the provision information is to be provided, on the basis of a distance between the output apparatus which is to be provided with the provision information and each of the recognized users, and a level of priority of the provision information.

(14)

The information processing system according to (12), wherein the control unit provides the provision information in an order in which approvals from the users have been given.

(15)

The information processing system according to any one of (1) to (14), wherein the provision information is a voice obtained by translating a speech of the user.

(16)

The information processing system according to any one of (1) to (15), wherein an output apparatus which is to be provided with the provision information is a signage terminal.

(17)

A storage medium storing a program for causing a computer to function as:
  a recognition unit configured to recognize a user;
  a provision unit configured to provide specific information specific to the user recognized by the recognition unit; and
  a control unit configured to control the provision unit so that the provision unit provides provision information to the user according to approval from the user.

(18)

An information processing method executed by a processor, the method including:
  recognizing a user;
  providing specific information specific to the recognized user; and
  performing control such that provision information is provided to the user according to approval from the user.

REFERENCE SIGNS LIST 1 information providing system
10 user device
110 wireless communication unit
120 audio input/output unit
130 location information acquisition unit
140 sensor unit
150 control unit
20 output apparatus
210 communication unit
220 output unit
230 control unit
30 server
310 communication unit
320 control unit
322 recognition unit
324 output control unit
40 user information DB
50 provision information DB
60 network
70 setting terminal

The invention claimed is:

1. An information processing system comprising: circuitry configured to function as
  a recognition unit configured to recognize a user;
  a provision unit configured to display, on a signage terminal in a public space, an authentication code specific to the user recognized by the recognition unit;
  the recognition unit further configured to detect a passcode input by the user in response to the authentication code, the passcode indicating whether or not there is approval from the user for the signage terminal in the public space to display provision information corresponding to the user; and
  a control unit configured to prevent the provision unit from displaying the authentication code and to control whether the provision unit displays the provision information corresponding to the user on the signage terminal without requiring the approval from the user under a condition determined based on attribute information of a person located around the user.

2. The information processing system according to claim 1,
  wherein the control unit determines whether or not to prevent the provision unit from providing the authentication code on the basis of whether or not an output apparatus which is to be provided with the provision information is associated with the user.

3. The information processing system according to claim 2,
  wherein the control unit determines whether or not to prevent the provision unit from providing the authentication code to the user on the basis of a relationship between a location of the output apparatus and the user.

4. The information processing system according to claim 1,
  wherein the recognition unit recognizes a user who is located within a range which allows the user to recognize the provision information from an output apparatus which is to be provided with the provision information.

5. The information processing system according to claim 1,
  wherein the attribute information includes language information indicating a language which the person can understand.

6. The information processing system according to claim 1,
  wherein the recognition unit detects whether or not an action of the user matches a predetermined action pattern as the passcode input by the user.

7. The information processing system according to claim 1,
  wherein the recognition unit detects a rhythmic sound made by the user knocking together the user's upper and lower teeth as the passcode input by the user.

8. The information processing system according to claim 1,
  wherein the authentication code is an output pattern previously set by the user.

9. The information processing system according to claim 1,
  wherein the control unit controls the provision unit so that the provision unit provides the provision information while concealing personally identifiable information of the user included in the provision information.

10. The information processing system according to claim 9,
  wherein the control unit controls the provision unit so that the provision unit discloses personally identifiable information concealed according to an instruction from the user recognized by the recognition unit.

11. The information processing system according to claim 1,
  wherein, when the recognition unit recognizes a plurality of users, the control unit controls a provision form of the provision information which is provided to each of the users by the provision unit.

12. The information processing system according to claim 11,
  wherein the control unit selects the user to whom the provision information is to be provided, on the basis of a distance between the output apparatus which is to be provided with the provision information and each of the recognized users, and a level of priority of the provision information.

13. The information processing system according to claim 11,
  wherein the control unit provides the provision information in an order in which approvals from the users have been given.

14. The information processing system according to claim 1,
wherein the provision information is a voice obtained by translating a speech of the user.

15. The information processing system according to claim 1,
wherein an output apparatus which is to be provided with the provision information is a signage terminal.

16. The information processing system according to claim 1,
wherein the attribute information includes information indicating an interpersonal relationship between the user and the person located around the user.

17. The information processing system according to claim 1,
wherein the control unit is further configured to conceal the displayed provision information based on the attribute information.

18. A non-transitory storage medium storing a program for causing a computer, implemented using circuitry, to function as:
a recognition unit configured to recognize a user;
a provision unit configured to display, on a signage terminal in a public space, an authentication code specific to the user recognized by the recognition unit;
the recognition unit further configured to detect a passcode input by a user in response to the authentication code, the passcode indicating whether or not there is approval from the user for the signage terminal in the public space to display provision information corresponding to the user; and
a control unit configured to prevent the provision unit from displaying the authentication code and to control whether the provision unit displays the provision information corresponding to the user without requiring the approval from the user under a condition determined based on attribute information of a person located around the user.

19. An information processing method executed by a processor, the method comprising:
recognizing a user;
displaying an authentication code specific to the recognized user on a signage terminal in a public space;
detecting a passcode input by the user in response to the authentication code, the passcode indicating whether or not there is approval from the user for the signage terminal to display provision information corresponding to the user; and
performing control to prevent the provision unit from displaying the authentication code and to control whether the provision information corresponding to the user is displayed on the signage terminal in the public space without requiring the approval from the user under a condition determined based on attribute information of a person located around the user.

* * * * *